US012101599B1

(12) United States Patent
Mansour

(10) Patent No.: US 12,101,599 B1
(45) Date of Patent: Sep. 24, 2024

(54) SOUND SOURCE LOCALIZATION USING ACOUSTIC WAVE DECOMPOSITION

(71) Applicant: Amazon Technologies, Inc., Seattle, WA (US)

(72) Inventor: Mohamed Mansour, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 17/952,806

(22) Filed: Sep. 26, 2022

(51) Int. Cl.
*H04R 3/00* (2006.01)
*H04R 1/40* (2006.01)

(52) U.S. Cl.
CPC ............. *H04R 1/406* (2013.01); *H04R 3/005* (2013.01)

(58) Field of Classification Search
CPC ........... H04R 3/005; H04R 3/04; H04R 1/406
USPC ........................................................... 381/92
See application file for complete search history.

(56) References Cited

U.S. PATENT DOCUMENTS 11,521,591 B2 * 12/2022 Leppanen ............... H04S 7/306
11,579,275 B2 * 2/2023 Zaccá .................. H04R 29/007
11,924,618 B2 * 3/2024 Nongpiur ............... H04R 3/005

* cited by examiner

*Primary Examiner* — Disler Paul
(74) *Attorney, Agent, or Firm* — Pierce Atwood LLP

(57) ABSTRACT

Disclosed are techniques for an improved method for performing sound source localization (SSL) to determine a direction of arrival of an audible sound using a combination of timing information and amplitude information. For example, a device may decompose an observed sound field into directional components, then estimate a time-delay likelihood value and an energy-based likelihood value for each of the directional components. Using a combination of these likelihood values, the device can determine the direction of arrival corresponding to a maximum likelihood value. In some examples, the device may perform Acoustic Wave Decomposition processing to determine the directional components. In order to reduce a processing consumption associated with performing AWD processing, the device splits this process into two phases: a search phase that selects a subset of a device dictionary to reduce a complexity, and a decomposition phase that solves an optimization problem using the subset of the device dictionary.

20 Claims, 14 Drawing Sheets

FIG. 11

Time Delay Estimation
1110

$$P(\tau_k > \tau_l) \equiv P(\rho_{lk} > 0) \approx \frac{1}{2}\,\mathrm{erfc}\left(\frac{-\bar{\rho}_{lk}}{\sigma\sqrt{2}}\right)$$

Time-Delay Likelihood Estimation
1120

$$\bar{\beta}_l \approx \sum_{k \neq l} \log\left(\mathrm{erfc}\left(\frac{-\bar{\rho}_{lk}}{\sigma\sqrt{2}}\right)\right)$$

Energy Estimation
1130

$$E_l = \sum_{\omega} \|\alpha_l(\omega; t)\|^2 \; W(\omega)$$

Energy Likelihood Estimation
1140

$$\gamma_l = \begin{cases} -\log M & \text{if} \quad E_l > \nu.\max\{E_k\} \\ \varepsilon & \text{otherwise} \end{cases}$$

Local Aggregate Likelihood Estimation
1150

$$\chi(\phi; t) = \max\left(\chi(\phi; t)\ ;\ \beta_l + \gamma_l - \frac{(\phi - \phi_l)^2}{2\kappa}\right).$$

Global Aggregate Likelihood Estimation
1160

$$\bar{\chi}\phi) = \sum_t \chi(\phi; t)$$

SOUND SOURCE LOCALIZATION USING ACOUSTIC WAVE DECOMPOSITION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 11 illustrates equations used to determine likelihood values according to embodiments of the present disclosure.

DETAILED DESCRIPTION

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform Sound Source Localization (SSL) processing to determine a direction associated with the user and may isolate the audio data associated with this direction.

To improve sound source localization processing, offered is a technique for determining a direction of arrival using a combination of timing information and energy information. For example, a device may decompose an observed sound field into directional components, then estimate a time-delay likelihood value and an energy-based likelihood value for each of the directional components. The time-delay likelihood value indicates a likelihood that a particular directional component has a shortest time delay (e.g., arrived at the device first) of the directional components, while the energy-based likelihood value indicates a likelihood that the particular directional component has a highest energy value of the directional components. The device may use these likelihood values to identify a dominant directional component that corresponds to a direct path (e.g., line-of-sight) and distinguish the dominant directional component from other directional components that correspond to acoustic reflections. For example, the device may determine aggregate likelihood values and select a direction of arrival (e.g., azimuth) that corresponds to a maximum aggregate likelihood value.

In some examples, the device may perform Acoustic Wave Decomposition (AWD) processing to decompose the observed sound field into directional components, although the disclosure is not limited thereto. In order to reduce a processing consumption associated with performing AWD processing, the device may optionally split this estimation into two phases: a search phase that selects a subset of a device dictionary to reduce a complexity, and a decomposition phase that solves an optimization problem using the subset of the device dictionary.

Figure 1:
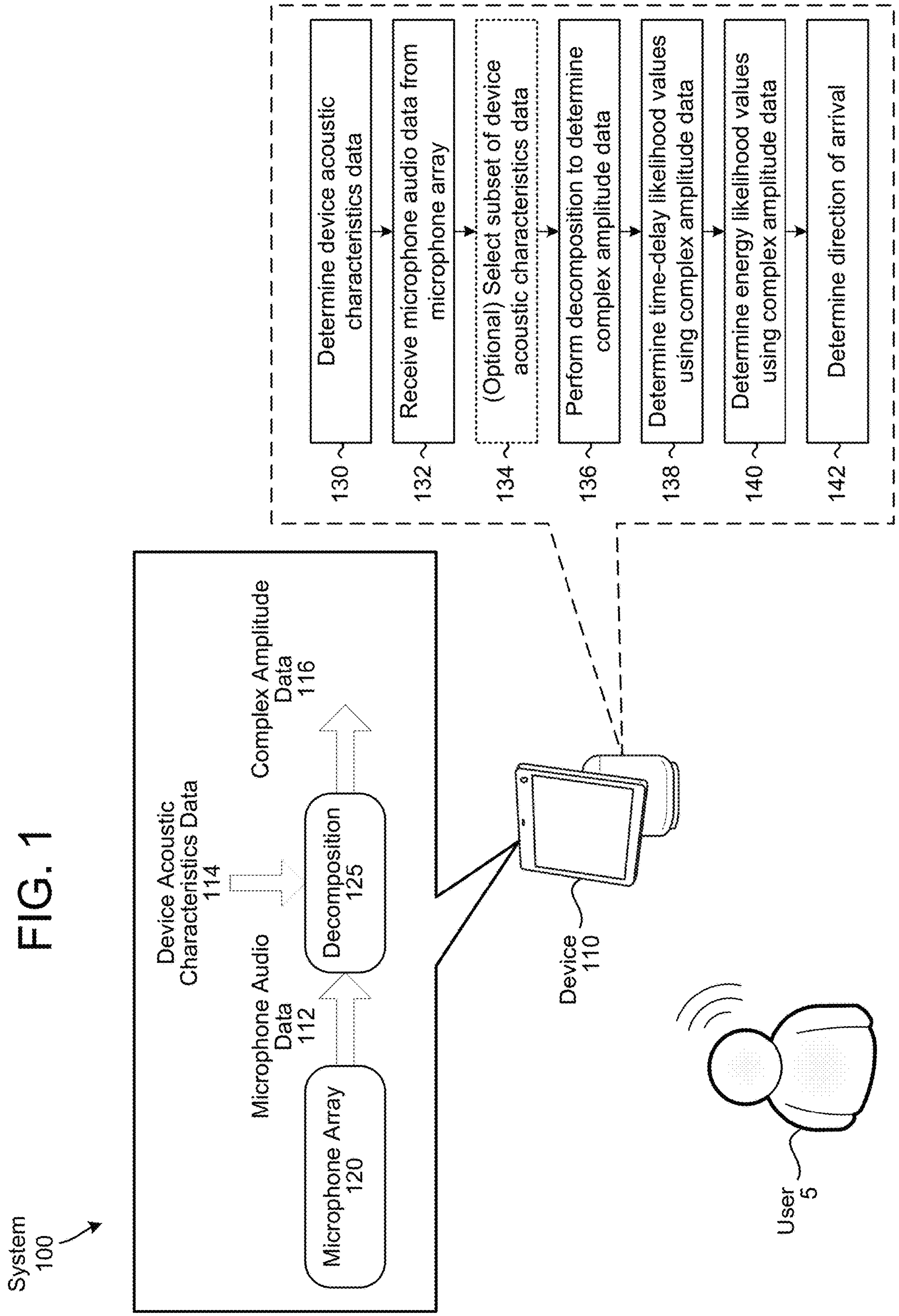
FIG. 1 illustrates system configured to perform sound source localization using acoustic wave decomposition according to embodiments of the present disclosure.

FIG. 1 illustrates a system configured to perform sound source localization using acoustic wave decomposition according to embodiments of the present disclosure. Although FIG. 1, and other figures/discussion illustrate the operation of the system 100 in a particular order, the steps described may be performed in a different order (as well as certain steps removed or added) without departing from the intent of the disclosure.

As illustrated in FIG. 1, the system 100 may comprise a device 110 configured to perform Sound Source Localization (SSL) processing to determine a direction of arrival associated with a sound source. For example, the device 110 may detect speech generated by a user 5 and may determine a direction of arrival corresponding to the user 5. However, the disclosure is not limited thereto and the device 110 may perform SSL processing to determine the direction of arrival associated with any audible sound generated by a sound source, including other devices 110, sound sources associated with acoustic noise, and/or the like without departing from the disclosure. While not illustrated in FIG. 1, the device 110 may be communicatively coupled to network(s) 199 and/or other components of the system 100, although the disclosure is not limited thereto.

The device 110 may include a microphone array 120 configured to generate microphone audio data 112. As is known and as used herein, "capturing" an audio signal and/or generating audio data includes a microphone transducing audio waves (e.g., sound waves) of captured sound to an electrical signal and a codec digitizing the signal to generate the microphone audio data 112.

As described in greater detail below with regard to FIGS. 4A-4C, the device 110 may be associated with device acoustic characteristics data 114 (e.g., a device dictionary), which may be calculated for the device 110 using either physical measurements or simulations. For example, the device acoustic characteristics data 114 represents the acoustic response of the device 110 to each acoustic plane-wave of interest, completely characterizing the device behavior for each acoustic plane-wave. Thus, the system 100 may use the device acoustic characteristics data 114 to accommodate for the acoustic wave scattering due to the device surface. Each entry of the device acoustic characteristics data 114 has the form $\{k(\omega, \theta, \phi)\}_{\omega,\theta,\phi}$, which represents the acoustic pressure vector (at all microphones) at frequency ω, for an acoustic plane-wave of azimuth 01 and elevation $\phi_l$. Thus, each entry in the device acoustic characteristics data 114 is a vector with a length that corresponds to a number of microphones included in the microphone array 120, and each element in the vector is the total acoustic pressure at one microphone in the microphone array 120 when an acoustic plane-wave with k $(\omega, \theta_l, \phi_l)$ hits the device 110.

In some examples, the device acoustic characteristics data 114 may include frequencies of interest up to a threshold value (e.g., 8 kHz), although the disclosure is not limited thereto and the device acoustic characteristics data 114 may include all frequencies without departing from the disclosure. Additionally or alternatively, the device acoustic characteristics data 114 may discretize azimuth values (e.g., azimuth angles) and elevation values (e.g., elevation angles) in a three-dimensional space with a first angle resolution (e.g., less than) 10°, which may result in a first number of entries (e.g., ~800 entries), although the disclosure is not limited thereto.

As illustrated in FIG. 1, the device 110 may include decomposition component 125 configured to determine complex amplitude data 116, which corresponds to directional components of the speech or audible sound. In some examples, the decomposition component 125 may be configured to perform Acoustic Wave Decomposition (AWD) processing to determine complex amplitude data 116. For example, the decomposition component 125 may process the microphone audio data 112 and the device acoustic characteristic data 114 to solve an optimization model in order to determine the complex amplitude data 116, as described in greater detail below with regard to FIG. 6.

In some examples, the device 110 may reduce a processing consumption associated with performing AWD processing by splitting this estimation into two phases, as described in greater detail below with regard to FIGS. 7-8. For example, the device 110 may implement a multistage solver that includes a search phase to select a subset of the device acoustic characteristic data 114 (e.g., to reduce a complexity) and a decomposition phase that solves the optimization problem using the subset of the device acoustic characteristic data 114. Thus, the device 110 may perform AWD processing to decompose an observed sound field into directional components that may be used to perform additional processing, such as sound source localization.

As illustrated in FIG. 1, the device 110 may determine (130) device acoustic characteristics data 114. As the device acoustic characteristics data 114 only need to be determined once for a particular microphone array, in some examples the device 110 may retrieve the device acoustic characteristics data 114 from a storage device without departing from the disclosure. In addition, the device 110 may receive (132) microphone audio data from the microphone array 120.

Using the microphone audio data 112 and the device acoustic characteristics data 114, the device 110 may optionally select (134) a subset of the device acoustic characteristics data 114 and may perform (136) decomposition to determine the complex amplitude data 116, as described in greater detail below with regard to FIGS. 6-8. For example, the device 110 may generate an optimization model and may solve the optimization model using a regularization function to determine the complex amplitude data 116. If the device 110 selected a subset of the device acoustic characteristics data 114 in step 134, the device 110 may perform this decomposition using the subset to reduce processing consumption, but the disclosure is not limited thereto. Additionally or alternatively, while the device 110 may perform decomposition using AWD processing, the disclosure is not limited thereto and the device 110 may perform decomposition using any technique known to one of skill in the art without departing from the disclosure.

To perform sound source localization, the device 110 may use the complex amplitude data 116 to determine a direction of arrival, as described in greater detail below with regard to FIGS. 9-11. As illustrated in FIG. 1, the device 110 may determine (138) time-delay likelihood values using the complex amplitude data 116 and may determine (140) energy likelihood values (e.g., energy-based likelihood values) using the complex amplitude data 116. For example, the device 110 may estimate a time-delay likelihood value and an energy-based likelihood value for each of the acoustic plane-waves (e.g., directional components). As used herein, a time-delay likelihood value may indicate a likelihood that a particular acoustic plane-wave has a shortest time delay (e.g., arrived at the device first) of a plurality of acoustic plane-waves, while an energy-based likelihood value may indicate a likelihood that the particular acoustic plane-wave has a highest energy value of the plurality of acoustic plane-waves.

Using these likelihood values, the device 110 may determine (142) a direction of arrival associated with the sound source (e.g., user 5). In some examples, the device 110 may determine aggregate likelihood values and select a direction of arrival (e.g., azimuth value) that corresponds to a first acoustic plane-wave having a maximum aggregate likelihood value. Thus, the device 110 may use the aggregate likelihood values to identify a dominant acoustic plane-wave that corresponds to a direct path (e.g., line-of-sight) between the sound source (e.g., user 5) and the device 110, distinguishing this acoustic plane-wave from other acoustic plane-waves that correspond to acoustic reflections.

In some examples, the device 110 may determine the direction of arrival using a combination of spatial aggregation (e.g., local aggregation) and/or temporal aggregation (e.g., global aggregation), as described below with regard to FIGS. 10-11. For example, the device 110 may perform spatial aggregation by looking at every azimuth value and aggregating everything within a particular range (e.g., aggregating from directional components to azimuth angles). In contrast, the device 110 may perform temporal aggregation over a desired time window by looking at selected azimuth values for a period of time and generating a single output azimuth value for the desired time window. While in some examples the device 110 may generate a single output azimuth value for each audio frame and/or the desired time window, the disclosure is not limited thereto and other examples the device 110 may determine two or more azimuth values having highest likelihood value(s) without departing from the disclosure.

In some examples, the desired time window may correspond to an acoustic event, such as a time boundary associated with a wakeword detected by the device 110. For example, the device 110 may detect a wakeword, determine a time boundary associated with the wakeword, and perform temporal aggregation within the time boundary to generate a single azimuth value associated with the wakeword. However, the disclosure is not limited thereto, and in some examples the desired time window may instead correspond to a fixed duration of time. For example, the device 110 may perform temporal aggregation to determine an azimuth value for each individual audio frame (e.g., 8 ms) without departing from the disclosure. In this example, the device 110 may determine an azimuth value for a series of audio frames and, if a wakeword is detected within a time boundary, may optionally determine a final azimuth value associated with the wakeword based on the audio frames within the time boundary.

In some examples, the device 110 may determine the direction of arrival by determining an azimuth value. However, the disclosure is not limited thereto, and in other examples the device 110 may determine the direction of arrival by determining an azimuth value and an elevation value without departing from the disclosure.

Acoustic theory tells us that a point source produces a spherical acoustic wave in an ideal isotropic (uniform) medium such as air. Further, the sound from any radiating surface can be computed as the sum of spherical acoustic wave contributions from each point on the surface, including any relevant reflections. In addition, acoustic wave propagation is the superposition of spherical acoustic waves generated at each point along a wavefront. Thus, all linear acoustic wave propagation can be seen as a superposition of spherical traveling waves.

Figure 2B:
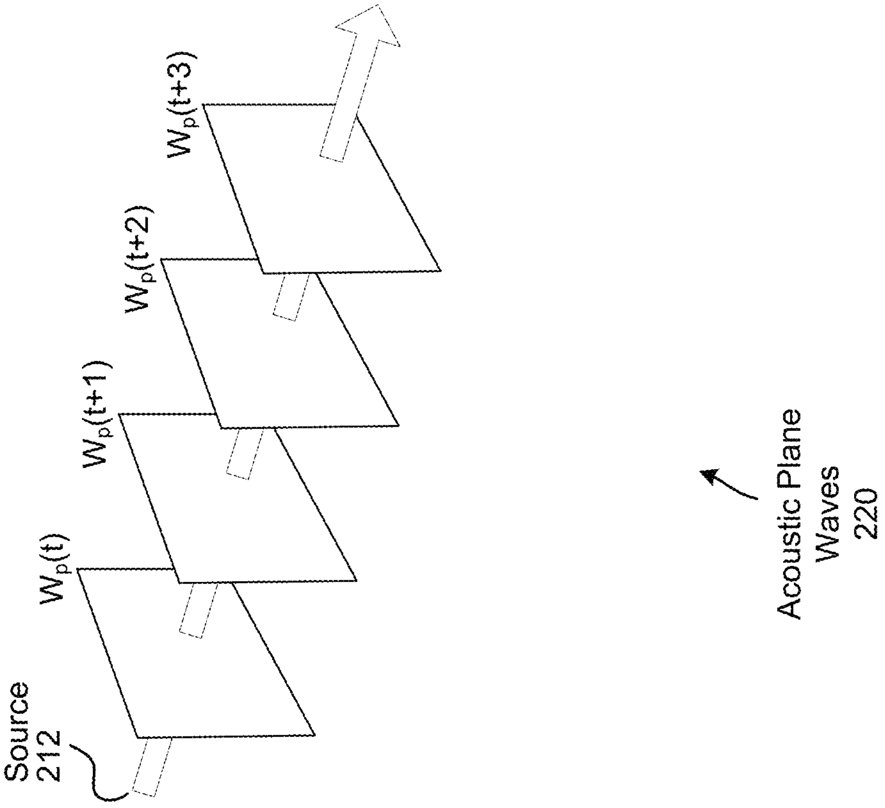
FIGS. 2A-2B illustrate examples of acoustic wave propagation.
Figure 2A:
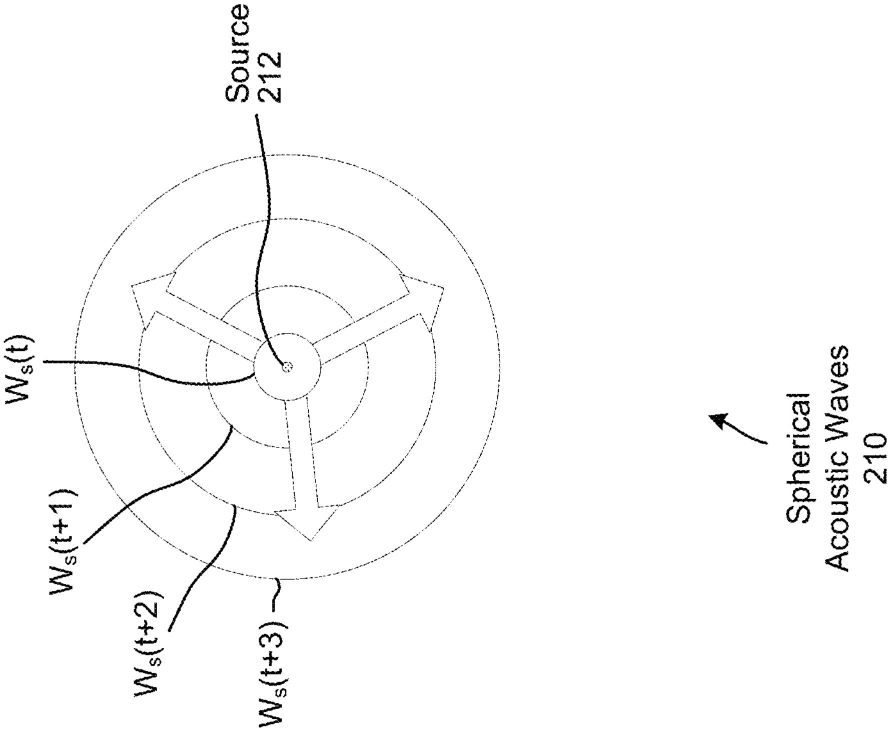

FIGS. 2A-2B illustrate examples of acoustic wave propagation. As illustrated in FIG. 2A, spherical acoustic waves 210 (e.g., spherical traveling waves) correspond to a wave whose wavefronts (e.g., surfaces of constant phase) are spherical (e.g., the energy of the wavefront is spread out over a spherical surface area). Thus, the source 212 (e.g., radiating sound source, such as a loudspeaker) emits spherical traveling waves in all directions, such that the spherical acoustic waves 210 expand over time. This is illustrated in FIG. 2A as a spherical wave $w_s$ with a first arrival having a first radius at a first time $w_s(t)$, a second arrival having a second radius at a second time $w_s(t+1)$, a third arrival having a third radius at a third time $w_s(t+2)$, a fourth arrival having a fourth radius at a fourth time $w_s(t+3)$, and so on.

Additionally or alternatively, acoustic waves can be visualized as rays emanating from the source 212, especially at a distance from the source 212. For example, the acoustic waves between the source 212 and the microphone array can be represented as acoustic plane waves. As illustrated in FIG. 2B, acoustic plane waves 220 (e.g., planewaves) correspond to a wave whose wavefronts (e.g., surfaces of constant phase) are parallel planes. Thus, the acoustic plane waves 220 shift with time t from the source 212 along a direction of propagation (e.g., in a specific direction), represented by the arrow illustrated in FIG. 2B. This is illustrated in FIG. 2B as a plane wave $w_p$ having a first position at a first time $w_p(t)$, a second position at a second time $w_p(t+1)$, a third position at a third time $w_p(t+2)$, a fourth position at a fourth time $w_p(t+3)$, and so on. While not illustrated in FIG. 2B, acoustic plane waves may have a constant value of magnitude and a linear phase, corresponding to a constant acoustic pressure.

Acoustic plane waves are a good approximation of a far-field sound source (e.g., sound source at a relatively large distance from the microphone array), whereas spherical acoustic waves are a better approximation of a near-field sound source (e.g., sound source at a relatively small distance from the microphone array). For ease of explanation, the disclosure may refer to acoustic waves with reference to acoustic plane waves. However, the disclosure is not limited thereto, and the illustrated concepts may apply to spherical acoustic waves without departing from the disclosure. For example, the device acoustic characteristics data may correspond to acoustic plane waves, spherical acoustic waves, and/or a combination thereof without departing from the disclosure.

Figure 3:
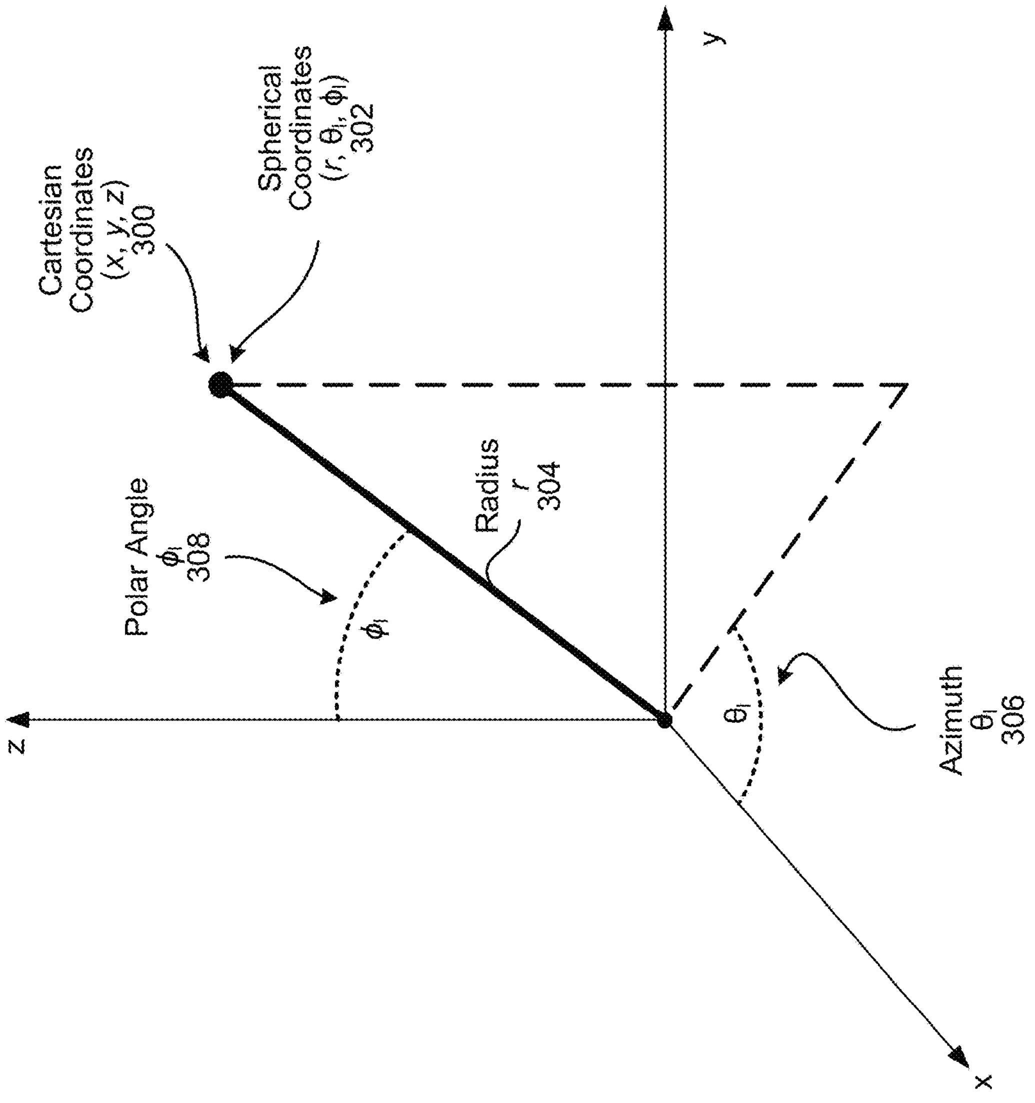
FIG. 3 illustrates an example of spherical coordinates.

FIG. 3 illustrates an example of spherical coordinates, which may be used throughout the disclosure with reference to acoustic waves relative to the microphone array. As illustrated in FIG. 3, Cartesian coordinates (x, y, z) 300 correspond to spherical coordinates (r, 01, ¢1) 302. Thus, using Cartesian coordinates, a location may be indicated as a point along an x-axis, a y-axis, and a z-axis using coordinates (x, y, z), whereas using spherical coordinates the same location may be indicated using a radius r 304, an azimuth $\theta_l$ 306 and a polar angle $\phi_l$ 308. The radius r 304 indicates a radial distance of the point from a fixed origin, the azimuth $\phi_l$ 306 indicates an azimuth angle of its orthogonal projection on a reference plane that passes through the origin and is orthogonal to a fixed zenith direction, and the polar angle $\phi_l$ 308 indicates a polar angle measured from the fixed zenith direction. Thus, the azimuth $\theta_l$ 306 varies between 0 and 360 degrees, while the polar angle $\phi_l$ 308 varies between 0 and 180 degrees.

Figure 4A:
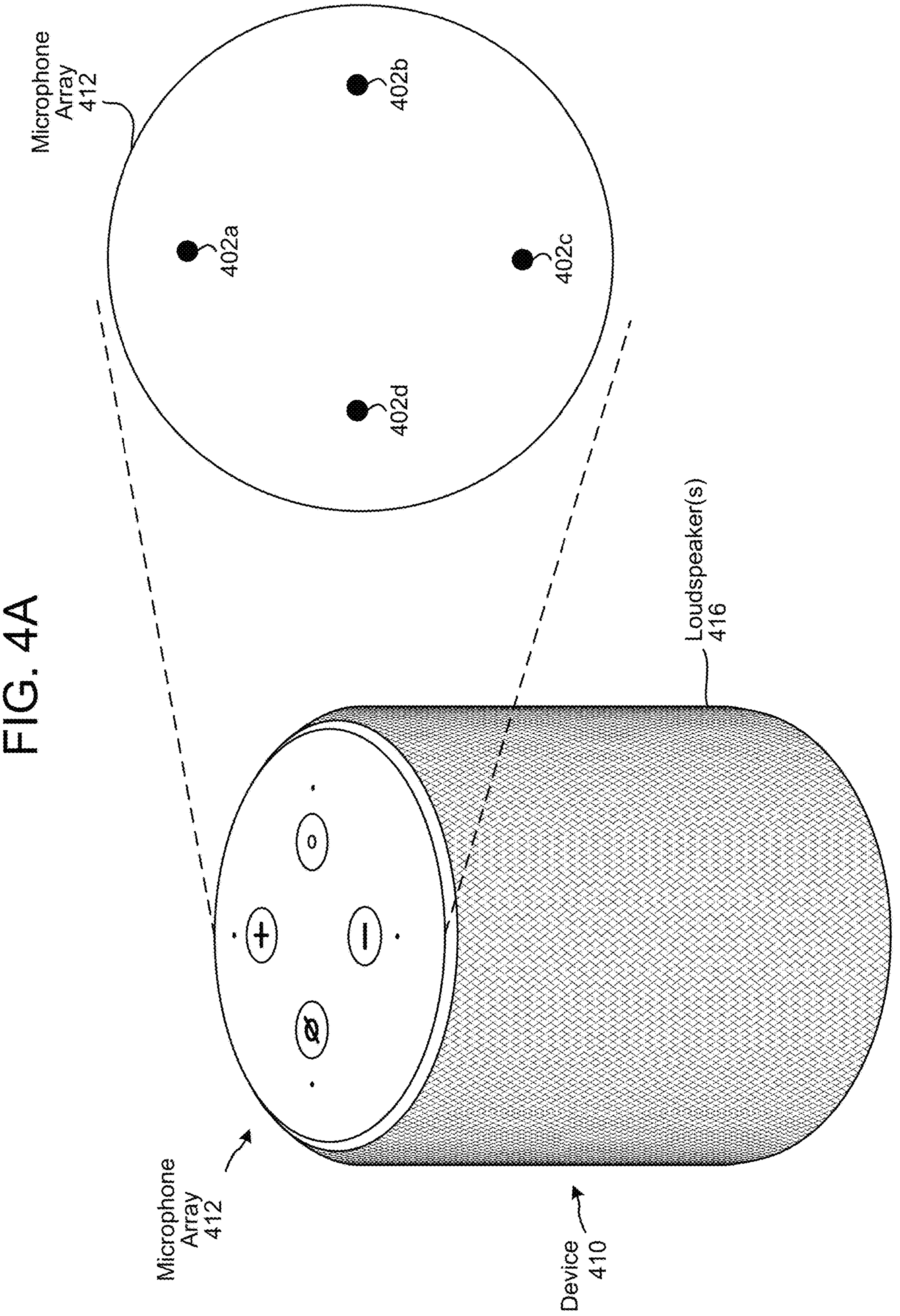
FIGS. 4A-4C illustrate a device having a microphone array and examples of determining a device response via simulation or measurement according to embodiments of the present disclosure.
Figure 4B:
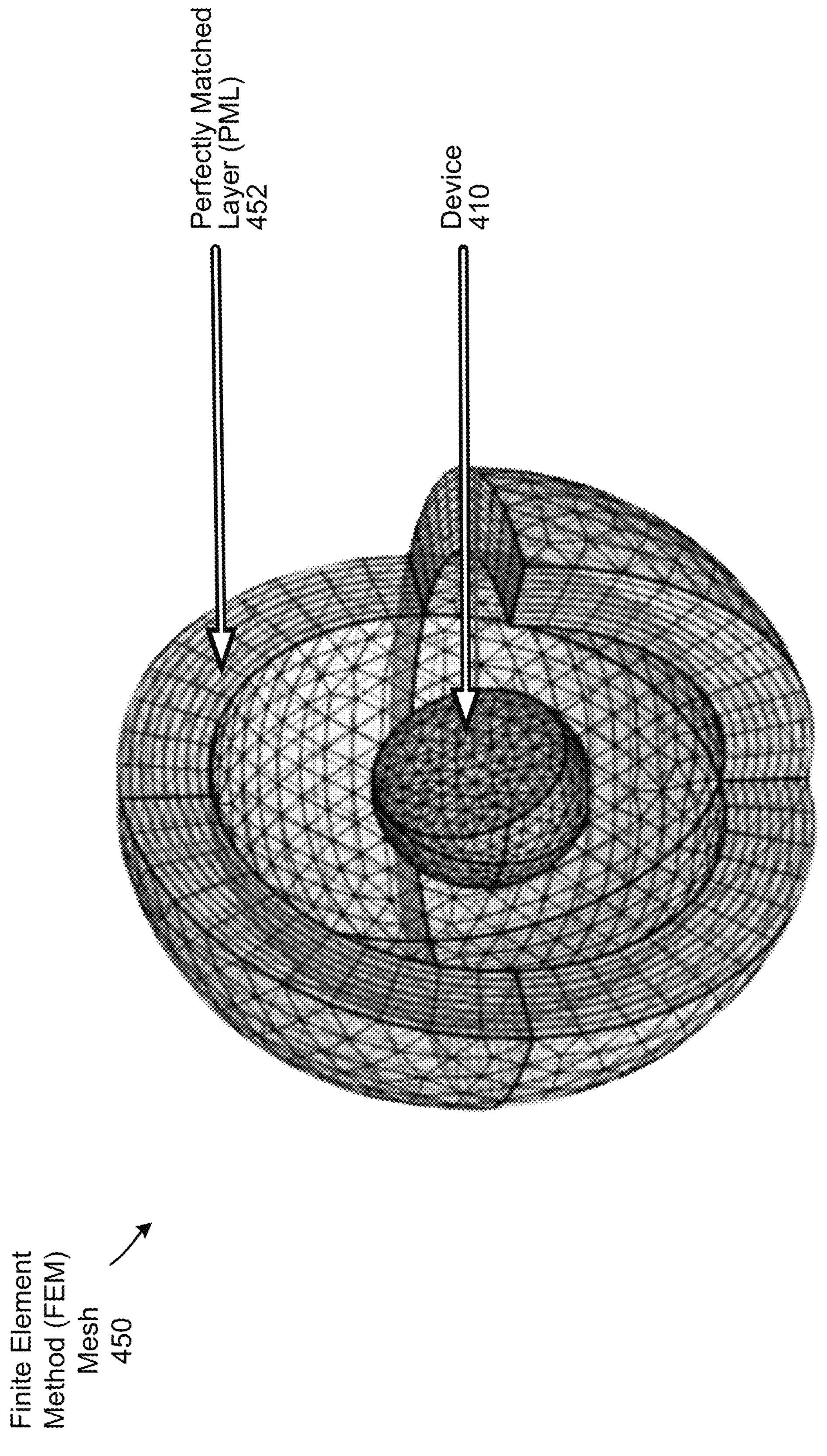
Figure 4C:
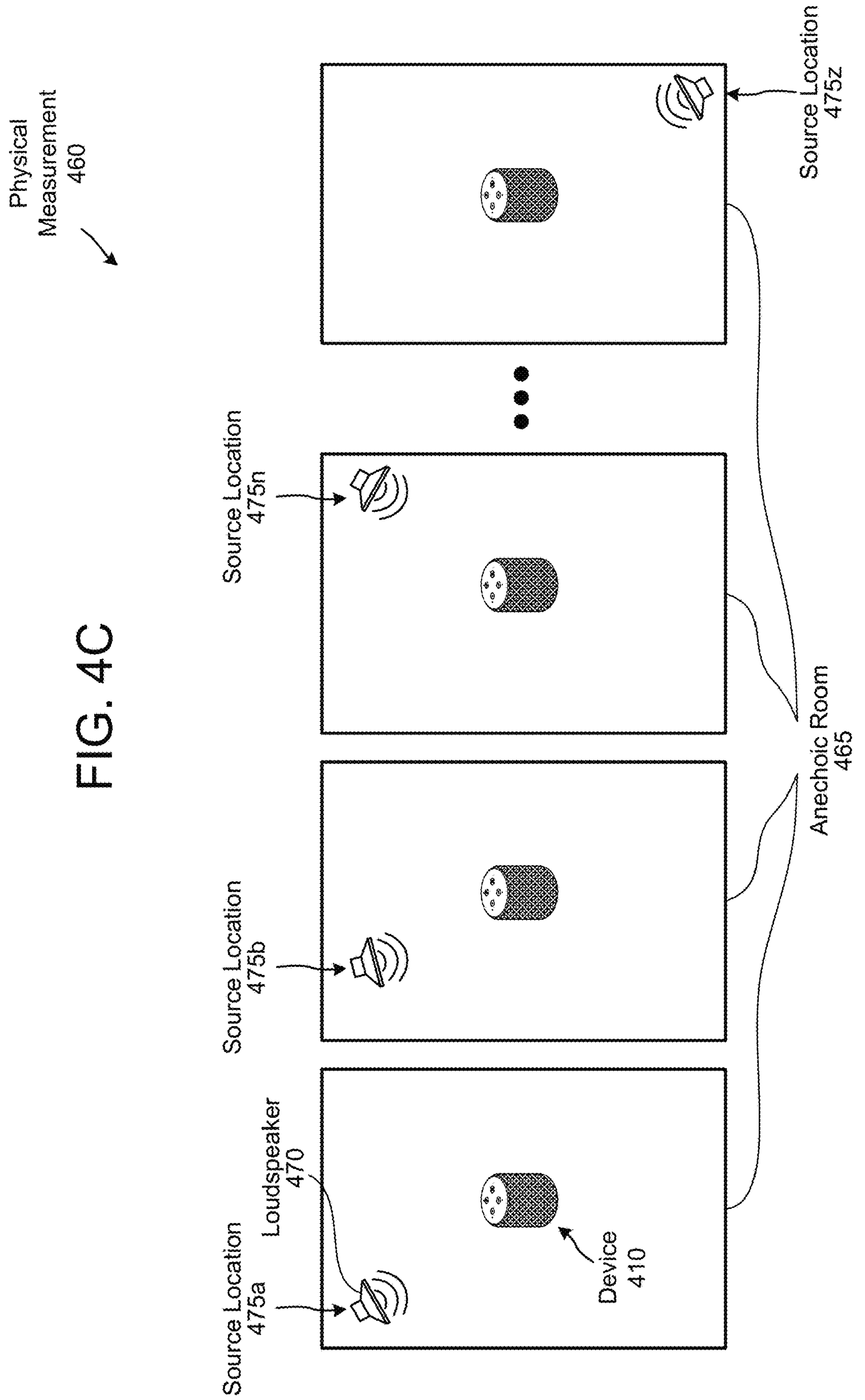

FIGS. 4A-4C illustrate a device having a microphone array and examples of determining a device response via simulation or measurement according to embodiments of the present disclosure. As illustrated in FIG. 4A, a device 410 may include, among other components, a microphone array 412, one or more loudspeaker(s) 416, and other components not illustrated in FIG. 4A. The microphone array 412 may include a number of different individual microphones 402. In the example configuration illustrated in FIG. 4A, the microphone array 412 includes four (4) microphones 402_a_-402_d_, although the disclosure is not limited thereto and the number of microphones 402 may vary without departing from the disclosure.

In some examples, the device 410 illustrated in FIG. 4A may correspond to the device 110 described above with regard to FIG. 1. For example, the system 100 may determine device acoustic characteristics data 114 associated with the device 110 and the device 110 may use the device acoustic characteristics data 114 to generate RIR data during operation.

The acoustic wave equation is the governing law for acoustic wave propagation in fluids, including air. In the time domain, the homogenous wave equation has the form:

$$\nabla^2 \overline{p} - \frac{1}{c^2}\frac{\partial^2 \overline{p}}{\partial t^2} = 0 \quad [1a]$$

where p (t) is the acoustic pressure and c is the speed of sound in the medium. Alternatively, the acoustic wave equation may be solved in the frequency domain using the Helmholtz equation to find p (f):

$$\nabla^2{}_p + k^2{}_p = 0 \quad [1b]$$

where k≅2πf/c is the wave number. At steady state, the time-domain and the frequency-domain solutions are Fourier pairs. The boundary conditions are determined by the geometry and the acoustic impedance of the difference boundaries. The Helmholtz equation is typically solved using Finite Element Method (FEM) techniques, although the disclosure is not limited thereto and the device 110 may solve using boundary element method (BEM), finite difference method (FDM), and/or other techniques without departing from the disclosure.

To analyze the microphone array 412, the system 100 may determine device acoustic characteristics data 114 associated with the device 410. For example, the device acoustic characteristics data 114 represents scattering due to the device surface (e.g., acoustic plane wave scattering caused by a surface of the device 410). Therefore, the system 100 needs to compute the scattered field at all microphones 402 for each plane-wave of interest impinging on a surface of the device 410. The total wave-field at each microphone of the microphone array 412 when an incident plane-wave $p_i(k)$ impinges on the device 410 has the general form:

$$p_t = p_i + p_s \quad [2]$$

where $p_t$ is the total wave-field, $p_i$ is the incident plane-wave, and $p_s$ is the scattered wave-field.

The device acoustic characteristics data 114 may represent the acoustic response of the device 410 associated with the microphone array 412 to each acoustic wave of interest. The device acoustic characteristics data 114 may include a plurality of vectors, with a single vector corresponding to a single acoustic wave. The number of acoustic waves may vary, and in some examples the acoustic characteristics data may include acoustic plane waves, spherical acoustic waves, and/or a combination thereof. In some examples, the device acoustic characteristics data 114 may include 1024 frequency bins (e.g., frequency ranges) up to a maximum frequency (e.g., 8 kHz, although the disclosure is not limited thereto). Thus, the system 100 may use the device acoustic characteristics data 114 to generate RIR data with a length of up to 2048 taps, although the disclosure is not limited thereto.

The entries (e.g., values) for a single vector represent an acoustic pressure indicating a total field at each microphone (e.g., incident acoustic wave and scattering caused by the microphone array) for a particular background acoustic wave. Each entry of the device acoustic characteristics data 114 has the form $\{z(\omega,\phi,\theta)\}_{\omega,\phi,\theta}$, which represents the acoustic pressure vector (at all microphones) at frequency $\omega$, for an acoustic wave of azimuth $\theta_l$ and elevation $\phi_l$. Thus, a length of each entry of the device acoustic characteristics data 114 corresponds to a number of microphones included in the microphone array.

These values may be simulated by solving a Helmholtz equation or may be directly measured using a physical measurement in an anechoic room (e.g., a room configured to deaden sound, such that there is no echo) with a distance point source (e.g., loudspeaker). For example, using techniques such as finite element method (FEM), boundary element method (BEM), finite difference method (FDM), and/or the like, the system 100 may calculate the total wave-field at each microphone. Thus, a number of entries in each vector corresponds to a number of microphones in the microphone array, with a first entry corresponding to a first microphone, a second entry corresponding to a second microphone, and so on.

In some examples, the system 100 may determine the device acoustic characteristics data 114 by simulating the microphone array 412 using wave-based acoustic modeling. For example, FIG. 4B illustrates an example using a finite element method (FEM), which models the device 410 using a FEM mesh 450. To have a true background acoustic wave, the external boundary should be open and non-reflecting. To mimic an open-ended boundary, the system 100 may use a perfectly matched layer (PML) 452 to define a special absorbing domain that eliminates reflection and refractions in the internal domain that encloses the device 410. While FIG. 4B illustrates using FEM processing, the disclosure is not limited thereto and the system 100 may use boundary element method (BEM) processing and/or other wave-based acoustic modeling techniques without departing from the disclosure.

The system 100 may calculate the total wave-field at all frequencies of interest with a background acoustic wave, where the surface of the device 410 is modeled as a sound hard boundary. If a surface area of an individual microphone is much smaller than a wavelength of the acoustic wave, the microphone is modeled as a point receiver on the surface of the device 410. If the surface area is not much smaller than the wavelength, the microphone response is computed as an integral of the acoustic pressure over the surface area.

Using the FEM model, the system 100 may calculate an acoustic pressure at each microphone (at each frequency) by solving the Helmholtz equation numerically with a background acoustic wave. This procedure is repeated for each possible acoustic wave and each possible direction to generate a full dictionary that completely characterizes a behavior of the device 410 for each acoustic wave (e.g., device response for each acoustic wave). Thus, the system 100 may simulate the device acoustic characteristics data 114 and may apply the device acoustic characteristics data 114 to any room configuration.

In other examples, the system 100 may determine the device acoustic characteristics data 114 described above by physical measurement 460 in an anechoic room 465, as illustrated in FIG. 4C. For example, the system 100 may measure acoustic pressure values at each of the microphones 402 in response to an input (e.g., impulse) generated by a loudspeaker 470. The input may correspond to white noise or other waveforms, and may include a frequency sweep across all frequency bands of interest (e.g., input signal includes white noise within all desired frequency bands).

To model all of the potential acoustic waves, the system 100 may generate the input using the loudspeaker 470 in all possible locations in the anechoic room 465. For example, FIG. 4C illustrates examples of the loudspeaker 470 generating inputs at multiple source locations 475 along a horizontal direction, such as a first input at a first source location 475*a*, a second input at a second source location 475*b*, and so on until an n-th input at an n-th source location 475*n*. This is intended to illustrate that the loudspeaker 470 generates the input at every possible source location 475 associated with a first horizontal row. In addition, the system 100 may generate the input using the loudspeaker 470 at every possible source location 475 in every horizontal row without departing from the disclosure. Thus, the loudspeaker 470 may generate inputs at every possible source location 475 throughout the anechoic room 465, until finally generating a z-th input at a z-th source location 475*z*.

Figure 5:
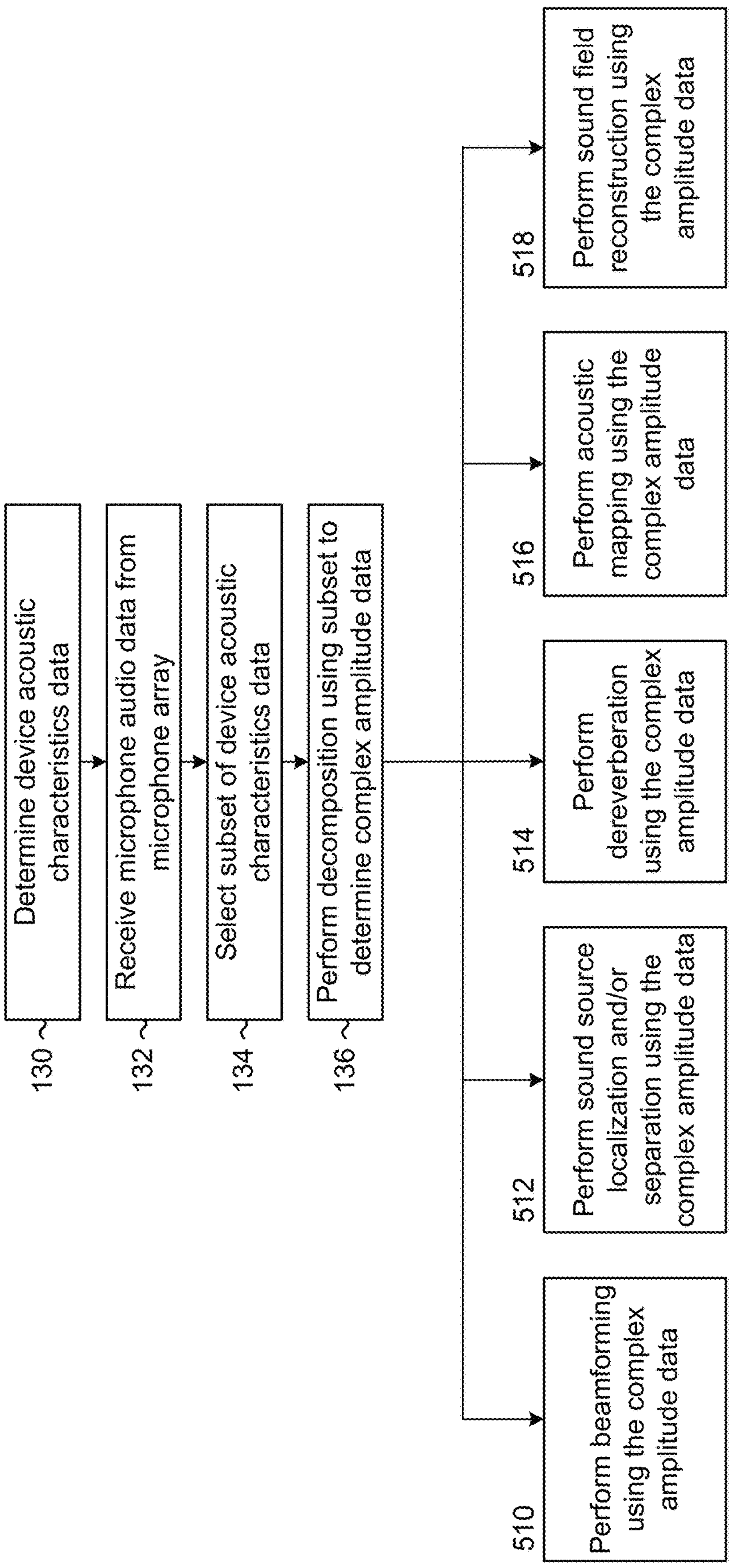
FIG. 5 is a flowchart conceptually illustrating example methods for performing additional processing using the complex amplitude data according to embodiments of the present disclosure.

FIG. 5 is a flowchart conceptually illustrating example methods for performing additional processing using the complex amplitude data according to embodiments of the present disclosure. As illustrated in FIG. 5, the device 110 may perform steps 130-136 to determine complex amplitude data 116, as described in greater detail above with regard to FIG. 1. As these steps are described above, a redundant description is omitted.

After determining the complex amplitude data 116, the device 110 may use the complex amplitude data 116 to perform a variety of functions. As illustrated in FIG. 5, in some examples the device 110 may perform (510) beamforming using the complex amplitude data 116. For example, the device 110 may perform acoustic beamforming based on the device acoustic characteristics data 114, the complex amplitude data 116, and/or the like, to distinguish between different directions relative to the microphone array 120. Additionally or alternatively, the device 110 may perform (512) sound source localization and/or separation using the complex amplitude data 116. For example, the device 110 may distinguish between multiple sound source(s) in the environment and generate audio data corresponding to each of the sound source(s), although the disclosure is not limited thereto. In some examples, the device 110 may perform (514) dereverberation using the complex amplitude data 116.

The device 110 may also perform (516) acoustic mapping using the complex amplitude data 116. In some examples, the device 110 may perform acoustic mapping such as generating a room impulse response (RIR). The RIR corresponds to an impulse response of a room or environment surrounding the device, such that the RIR is a transfer function of the room between sound source(s) and the microphone array 120 of the device 110. For example, the device 110 may generate the RIR by using the complex amplitude data 116 to determine an output signal corresponding to the sound source(s) and/or an input signal corresponding to the microphone array 120. The disclosure is not limited thereto, and in other examples, the device 110 may perform acoustic mapping to generate an acoustic map (e.g., acoustic source map, heatmap, and/or other representation) indicating acoustic sources in the environment. For example, the device 110 may locate sound source(s) in the environment and/or estimate their strength, enabling the device 110 to generate an acoustic map indicating the relative positions and/or strengths of each of the sound source(s). These sound source(s) include users within the environment, loudspeakers or other device(s) in the environment, and/or other sources of audible noise that the device 110 may detect.

Finally, the device 110 may perform (518) sound field reconstruction using the complex amplitude data 116. For example, the device 110 may perform sound field reconstruction to reconstruct a magnitude of sound pressure at various points in the room (e.g., spatial variation of the sound field), although the disclosure is not limited thereto. While FIG. 5 illustrates several examples of implementations that make use of the complex amplitude data 116, the disclosure is not limited thereto and the device 110 may use the complex amplitude data 116 in other techniques without departing from the disclosure. For example, the device 110 may use the complex amplitude data 116 to perform binaural rendering and/or the like without departing from the disclosure.

Figure 6:
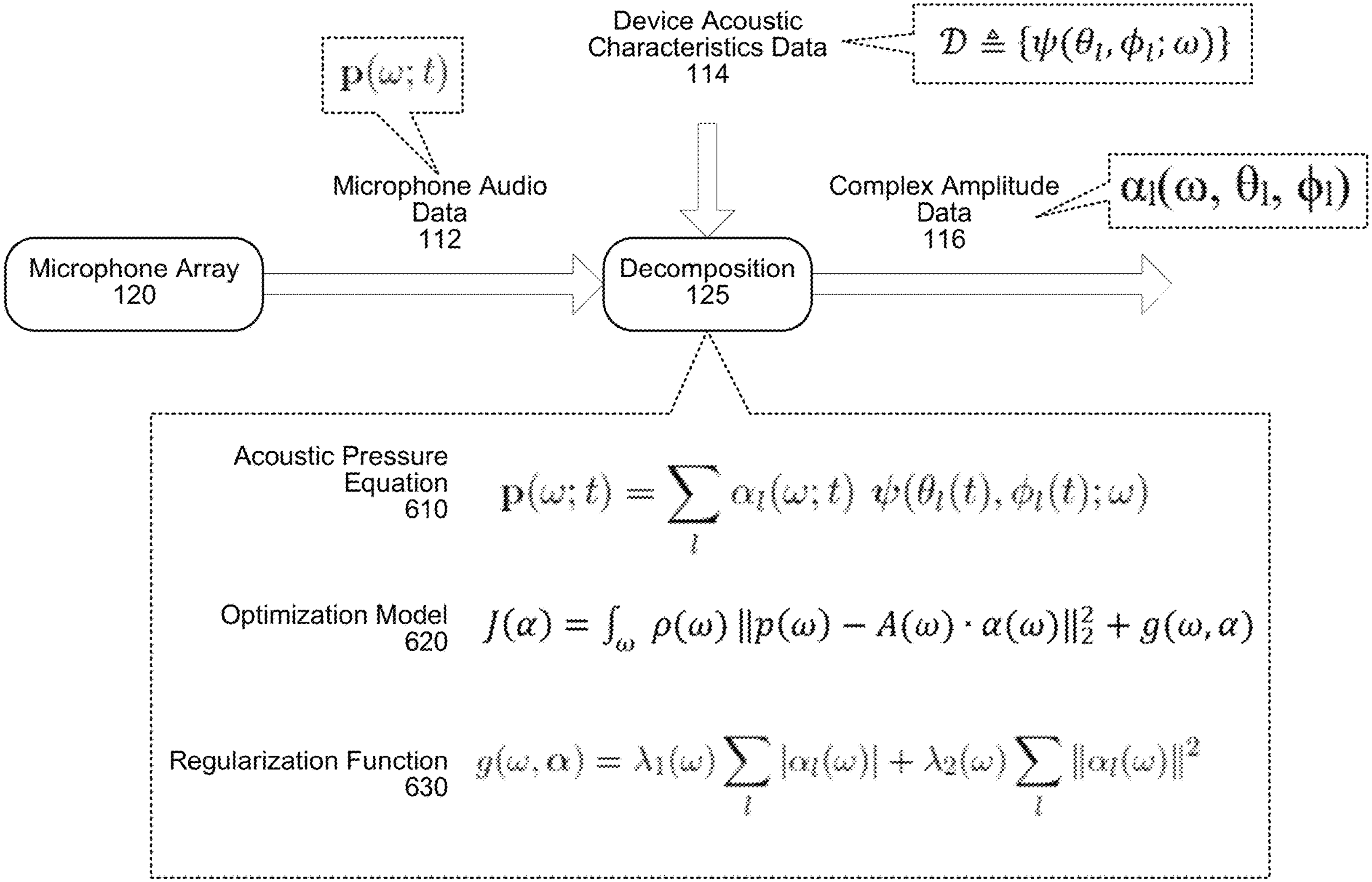
FIG. 6 illustrates an example of performing acoustic wave decomposition using a multi-stage solver according to embodiments of the present disclosure.

FIG. 6 illustrates an example of performing acoustic wave decomposition using a multi-stage solver according to embodiments of the present disclosure. As illustrated in FIG. 6, the microphone array 120 may generate microphone audio data 112 and the decomposition component 125 may use the microphone audio data 112 and the device acoustic characteristics data 114 to determine the complex amplitude data 116. In some examples, the decomposition component 125 may perform acoustic wave decomposition to determine the complex amplitude data 116, but the disclosure is not limited thereto.

As described above, the propagation of acoustic waves in nature is governed by the acoustic wave equation, whose representation in the frequency domain (e.g., Helmholtz equation), in the absence of sound sources, is illustrated in Equation [1b]. In this equation, p (@) denotes the acoustic pressure at frequency @, and k denotes the wave number. Acoustic plane waves are powerful tools for analyzing the wave equation, as acoustic plane waves are a good approximation of the wave-field emanating from a far-field point source. The acoustic pressure of a plane-wave with vector wave number k is defined at point r=(x, y, z) in the three-dimensional space as:

$$\psi(k) \triangleq p_0 e^{-jk^T r} \qquad [3]$$

where k is the three-dimensional wavenumber vector. For free-field propagation, k has the form:

$$k(\omega, \theta, \phi) = \frac{\omega}{c}\begin{pmatrix} \cos(\phi)\sin(\theta) \\ \sin(\phi)\sin(\theta) \\ \cos(\theta) \end{pmatrix} \qquad [4]$$

where c is the speed of sound, and ϕ and θ are respectively the elevation and azimuth of the vector normal to the plane wave propagation. Note that k in Equation [1b] is |k|. A local solution to the homogenous Helmholtz equation can be approximated by a linear superposition of plane waves:

$$p(\omega)=\Sigma_{l\in\Lambda}\alpha_l\psi(\kappa_l(\omega, \theta_l, \varphi_l)) \qquad [5]$$

where A is a set of indices that defines the directions of plane waves {ϕ, θ}, each ψ(k) is a plane wave as in Equation [3] with k as in Equation [4], and $\{\alpha_l\}$ are complex scaling factors (e.g., complex amplitude data 116) that are computed to satisfy the boundary conditions. In FIG. 6, the complex amplitude data 116 is illustrated as $a_l(\omega, \theta_l, \phi_l)$, although the disclosure is not limited thereto. Even though the expansion in Equation [5] is derived using pure mathematical tools, it has an insightful physical interpretation, where the acoustic pressure at a point is represented as a superposition of pressure values due to far-field point sources.

When an incident plane wave w (k) impinges on a rigid surface, scattering takes effect on the surface. The total acoustic pressure at a set of points on the surface is the superposition of incident acoustic pressure (e.g., free-field plane wave) and scattered acoustic pressure caused by the device 110. The total acoustic pressure can be either measured in an anechoic room or simulated by numerically solving the Helmholtz equation with background acoustic plane wave ψ(k).

The total acoustic pressure on the device surface is illustrated in FIG. 6 as acoustic pressure equation 610:

$$p(\omega;t)=\Sigma_l\alpha_l(\omega;t)\psi(\theta_l(t), \phi_l(t);\omega) \qquad [6]$$

where w $(\theta_l(t), \phi_l(t); \omega)$ denotes the free-field acoustic plane waves from Equation [5] and $\{\alpha_l\}$ denotes the corresponding weights (e.g., complex amplitude data 116).

The ensemble of all vectors that span the three-dimensional space at all frequencies @ may be referred to as the acoustic dictionary of the device (e.g., device acoustic characteristics data 114). Each entry of the device dictionary can be either measured in an anechoic room with single-frequency far-field sources, or computed numerically by solving the Helmholtz equation on the device surface with background plane-wave using a simulation or model of the device (e.g., computer-assisted design (CAD) model). Both methods yield the same result, but the numerical method has a lower cost and is less error-prone because it does not require human labor. For the numerical method, each entry in the device dictionary is computed by solving the Helmholtz equation, using Finite Element Method (FEM) techniques, Boundary Element Method (BEM) techniques, and/or the like, for the total field at the microphones with a given background plane wave ψ(k). The device model is used to specify the boundary in the simulation, and it is modeled as a sound hard boundary. To have a true background plane-wave, the external boundary should be open and non-reflecting. In the simulation, the device is enclosed by a closed boundary (e.g., a cylinder or spherical surface. To mimic an open-ended boundary, the simulation may use a Perfectly Matched Layer (PML) that defines a special absorbing domain that eliminates reflection and refractions in the internal domain that encloses the device. The acoustic dictionary (e.g., device acoustic characteristics data 114) has the form:

$$\mathcal{D} \triangleq \{\psi(\theta_l, \phi_l; \omega): \forall \omega, l\} \quad [7]$$

where each entry in the dictionary is a vector whose size equals the microphone array size, and each element in the vector is the total acoustic pressure at one microphone in the microphone array when a plane wave with k ($\omega_l$, $\theta_l$, $\phi_l$) hits the device 110. The dictionary also covers all frequencies of interest, which may be up to 8 kHz but the disclosure is not limited thereto. The dictionary discretizes the azimuth and elevation angles in the three-dimensional space, with angle resolution typically less than 10°. Therefore, the device dictionary may include roughly 800 entries (e.g., [$\mathcal{D}$] ~800 entries).

The objective of the decomposition algorithm is to find the best representation of the observed sound field (e.g., microphone audio data 112 y(ω)) at the microphone array 120, using the device dictionary $\mathcal{D}$. A least-square formulation can solve this optimization problem, where the objective is to minimize:

$$J(\alpha) = \int_{\omega}^{\square} \rho(\omega)\left\| p(\omega) - \sum\nolimits_{l \in \Lambda} \alpha_l(\omega)\psi(\theta_l, \phi_l; \omega)\right\|_2^2 + g(\omega, \alpha) \quad [8]$$

where g(.) is a regularization function and p(.) is a weighting function. An equivalent matrix form (e.g., optimization model 620) is:

$$J(\alpha) = \int_{\omega}^{\square} \rho(\omega)\|p(\omega) - A(\omega) \cdot \alpha(\omega)\|_2^2 + g(\omega, \alpha) \quad [9]$$

where the columns of A (ω) are the individual entries of the acoustic characteristics data 114 at frequency ω. In Equation [8], A refers to the nonzero indices of the dictionary entries, which represent directions in the three-dimensional space, and is independent of ω. This independents stems from the fact that when a sound source emits broadband frequency content, it is reflected by the same boundaries in its propagation path to the receiver. Therefore, all frequencies have components from the same directions but with different strengths (e.g., due to the variability of reflection index with frequency), which is manifested by the components $\{\alpha_l(\omega)\}$. Each component is a function of the source signal, the overall length of the acoustic path of its direction, and the reflectivity of the surfaces across its path. This independent between Δ and ω is a key property in characterizing the optimization problem in Equation [9].

The typical size of an acoustic dictionary is ~$10^3$ entries, which corresponds to an azimuth resolution of 5° and an elevation resolution of 10°. In a typical indoor environment, approximately 20 acoustic plane waves are sufficient for a good approximation in Equation [6]. Moreover, the variability in the acoustic path of the different acoustic waves at each frequency further reduces the effective number of acoustic waves at individual frequencies. Hence, the optimization problem in Equation [9] is a sparse recovery problem and proper regularization is needed to stimulate a sparse α. This requires L1-regularization, such as the L1-regularization used in standard least absolute shrinkage and selection operator (LASSO) optimization. To improve the perceptual quality of the reconstructed audio, L2-regularization is added, and the regularization function g (a) (e.g., regularization function 630) has the general form of elastic net regularization:

$$g(\omega,\alpha)=\lambda_l(\omega)\Sigma_l|\alpha_l(\omega)|+\lambda_2(\omega)\Sigma_l\|\alpha_l(\omega)\|^2 \quad [10]$$

The strategy for solving the elastic net optimization problem in Equation [9] depends on the size of the microphone array. If the microphone array size is big (e.g., greater than 20 microphones), then the observation vector is bigger than the typical number of nonzero components in α, making the problem relatively simple with several efficient solutions. However, the problem becomes much harder when the microphone array is relatively small (e.g., fewer than 10 microphones). In this case, the optimization problem at each frequency @ becomes an undetermined least-square problem because the number of observations is less than the expected number of nonzero elements in the output. Thus, the elastic net regularization illustrated in Equation is necessary. Moreover, the invariance of directions (e.g., indices of nonzero elements Δ) with frequency could be exploited to reduce the search space for a more tractable solution, which is computed in two steps. Two example methods for solving this optimization problem are illustrated in FIGS. 8-7, as described in greater detail below.

Figure 7:
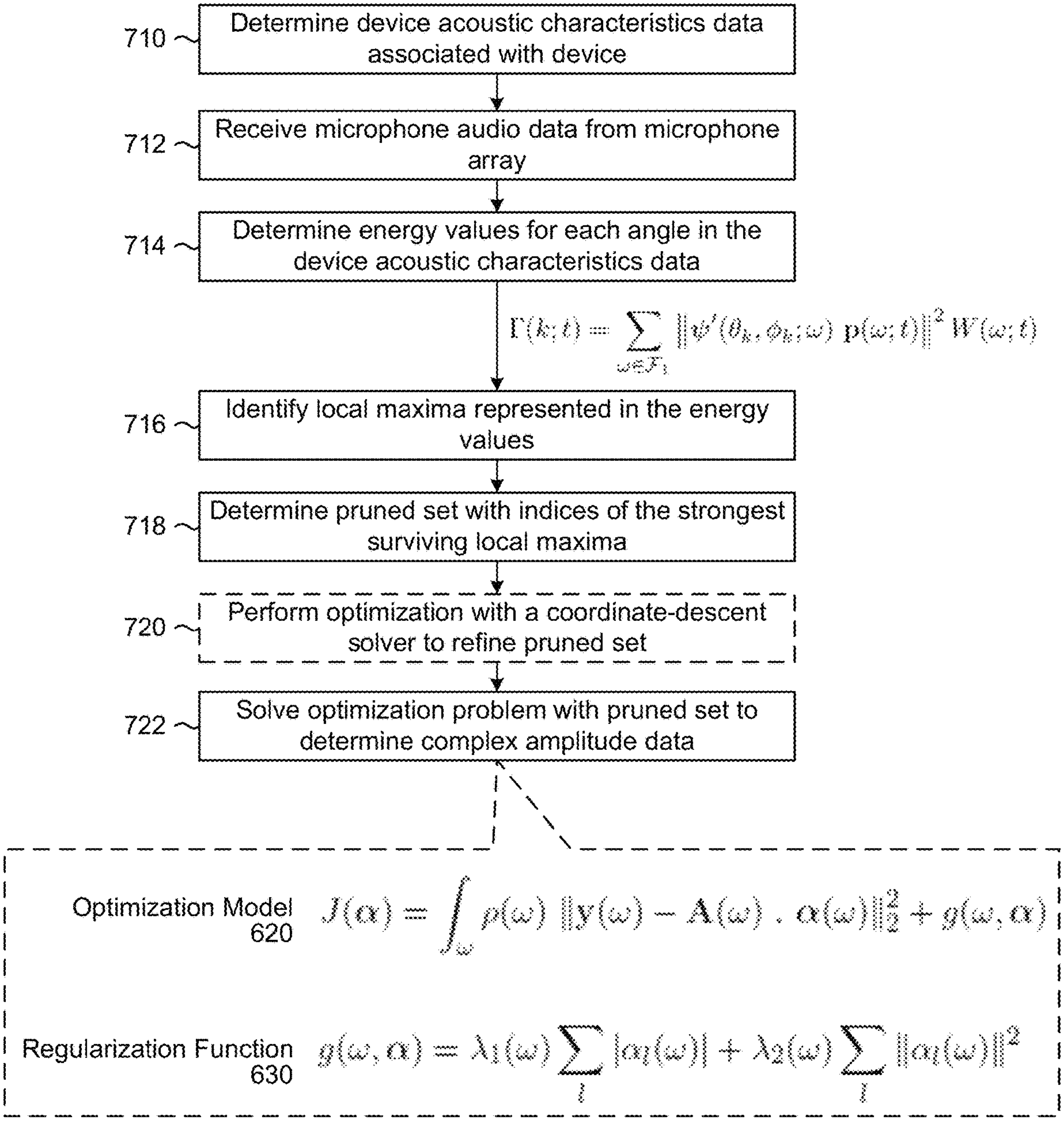
FIG. 7 is a flowchart conceptually illustrating an example method for performing acoustic wave decomposition to determine complex amplitude data according to embodiments of the present disclosure.

FIG. 7 is a flowchart conceptually illustrating an example method for performing acoustic wave decomposition to determine complex amplitude data according to embodiments of the present disclosure. As illustrated in FIG. 7, the device 110 may determine (710) device acoustic characteristics data 114 associated with the device 110 and may receive (712) microphone audio data 112 from the microphone array 120.

The first step computes a pruned set of indices A that contains the nonzero coefficients at all frequencies. This effectively reduces the problem size from |$\mathcal{D}$| to |Δ|, which is a reduction of about two orders of magnitude. The pruned set A is computed by a two-dimensional matched filter followed by a small scale LASSO optimization. In some examples, the device 110 may determine (714) energy values for each angle in the device acoustic characteristics data 114. For example, for each angle ($\theta_l$, $\phi_l$) in the device dictionary, the device 110 may calculate:

$$\Gamma(k;t)=\sum\nolimits_{\omega\in\mathcal{F}_1}\|\psi'(\theta_k,\phi_k;\omega)p(\omega;t)\|^2 W(\omega;t) \quad [11]$$

where the weighting W (@;t) is a function of the signal-to-noise-ratio (SNR) (e.g., signal quality metric) of the corresponding time-frequency cell (e.g., frequency band). This metric is only calculated when the target signal is present. To account for variation across elevation, the above score may be averaged over its neighboring angles:

$$\bar{\Gamma}(k;t) = \frac{1}{|\mathbb{B}(k)|}\sum\nolimits_{l\in\mathbb{B}^{(k)}}\Gamma(l;t) \quad [12]$$

where $\mathbb{B}^{(k)}$ is the set of neighboring angles to ($\phi_k$, $\theta_k$).

The device 110 may identify (716) local maxima represented in the energy values. For example, the device 110 may identify local maxima of (k, t) and discard values in the neighborhood of the stronger maxima (e.g., values for angles within 10° of the local maxima). This pruning is needed to improve the numerical stability of the optimization problem.

The device 110 may determine (718) pruned set with indices of the strongest surviving local maxima. For example, the device 110 may find a superset $\bar{\Delta}$ with the indices of the strongest surviving local maxima of ($\theta_l$, $\phi_l$), with $|\bar{\Delta}|\geq|\Delta|$. In some examples, the device 110 may optionally perform (720) optimization with a coordinate-descent solver to refine the pruned set. For example, the device 110 may run LASSO optimization with coordinate-descent solver, but with entries limited to A, and may choose the indices of the highest energy components in the output solution as A. This search procedure runs only on a subset of high energy frequency components, rather than the whole spectrum, and does not need to run at each time frame. The LASSO optimization in the last step yield a higher accuracy at a small complexity cost because a small number of iterations is sufficient to converge to A.

The second step in the solution procedure solves the elastic net optimization problem in Equation [9] with the pruned set A to calculate the complex amplitude data 116 (e.g., $\{\alpha_l(@)_{l\in\Delta}\}$ for all @. Thus, the device 110 may solve (722) the optimization problem with the pruned set to determine the complex amplitude data 116. For example, the device 110 may use the optimization model 620 and the regularization function 630 described above with regard to FIG. 6 to determine the complex amplitude data 116. In some examples, the device 110 may use the coordinate-descent procedure, as it provides significant speedup as compared to gradient-descent, although the disclosure is not limited thereto. In addition, the regularization parameters (e.g., 21 and 22) may vary with frequency because the dictionary vectors are more correlated at lower frequencies.

Figure 8:
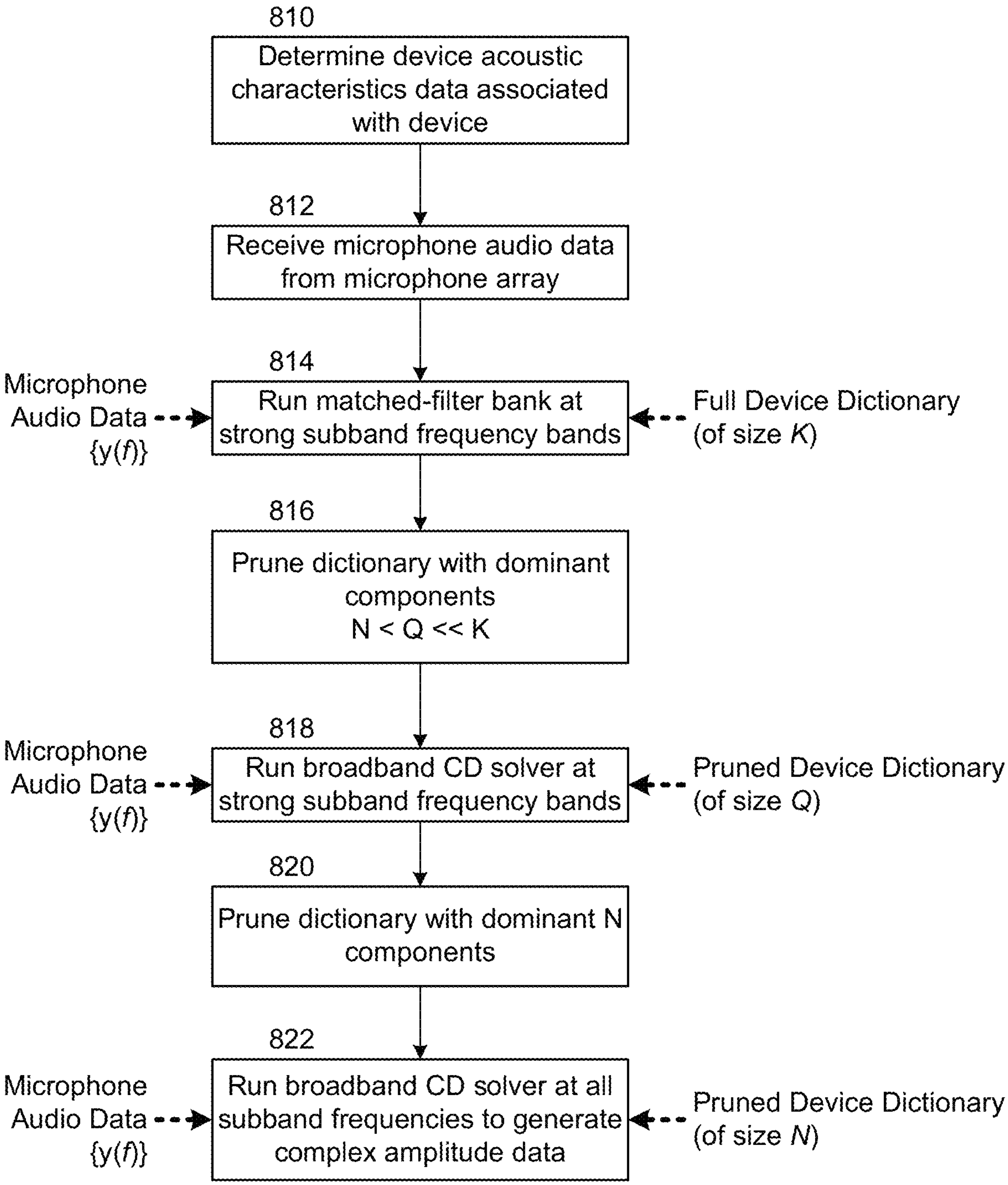
FIG. 8 is a flowchart conceptually illustrating an example method for performing acoustic wave decomposition to determine complex amplitude data according to embodiments of the present disclosure.

FIG. 8 is a flowchart conceptually illustrating an example method for performing acoustic wave decomposition to determine complex amplitude data according to embodiments of the present disclosure. As illustrated in FIG. 8, the device 110 may determine (810) device acoustic characteristics data associated with the device 110 and may receive (812) microphone audio data from the microphone array 120.

Similar to the method illustrated in FIG. 7, the device 110 may solve the optimization problem in two stages; a search stage and a decomposition stage. During the search stage, the device 110 may determine the subset of indices (e.g., n) of the active acoustic waves. This has the effect of reducing the search space for the size of the dictionary $|\mathcal{D}|$, which is in the order of a few hundred entries, to the number of active acoustic waves (N≈20). During the decomposition stage, the device 110 may calculate $\{\alpha_l(\omega)_{l\in\Delta}\}$ to minimize the optimization model 620.

The search phase is solved using a combination of sparse recovery and correlation methods. The main issue is that the number of microphones (e.g., M) is smaller than the number of acoustic waves (e.g., N), making it an undetermined problem that requires design heuristics (e.g., through regularization). As illustrated in FIG. 8, the search phase is done in two steps. In the first step, the device 110 may run (814) a matched-filter bank at strong subband frequency bands (e.g., selected frequency components). The number of matched filters is the dictionary size K, and the highest energy subbands are selected for this stage. The device 110 may determine the highest energy subbands using Equation or [12], described above. In the second step, the device 110 may prune (816) the dictionary with dominant components (e.g., N<Q<<K). For example, the device 110 may select the strongest Q components for further processing (e.g., only Q<<K components of the device dictionary are further processed).

In the second stage, the device 110 may run a limited broadband coordinate-descent (CD) solver on a subset of the subbands with small number of iterations to further refine the components selection to the subset whose size equals the target number of output components N. For example, FIG. 8 illustrates that the device 110 may run (818) a broadband CD solver at strong subband frequency bands, with the pruned device dictionary of size Q. Thus, the device 110 uses the pruned dictionary Q to reduce processing complexity. The device 110 may further prune (820) the dictionary with dominant N components, such that the output is the selected indices set n.

Using the pruned device dictionary (e.g., of size N), the device 110 may run (822) the broadband CD solver at all subband frequencies to generate the complex amplitude data 116. The regularization parameters in step 822 may be less strict than the regularization parameters of step 818 because of the smaller dictionary size. Further, the regularization parameters for each component may be weighted to be inversely proportional to its energy value calculated in step 814.

Figure 9:
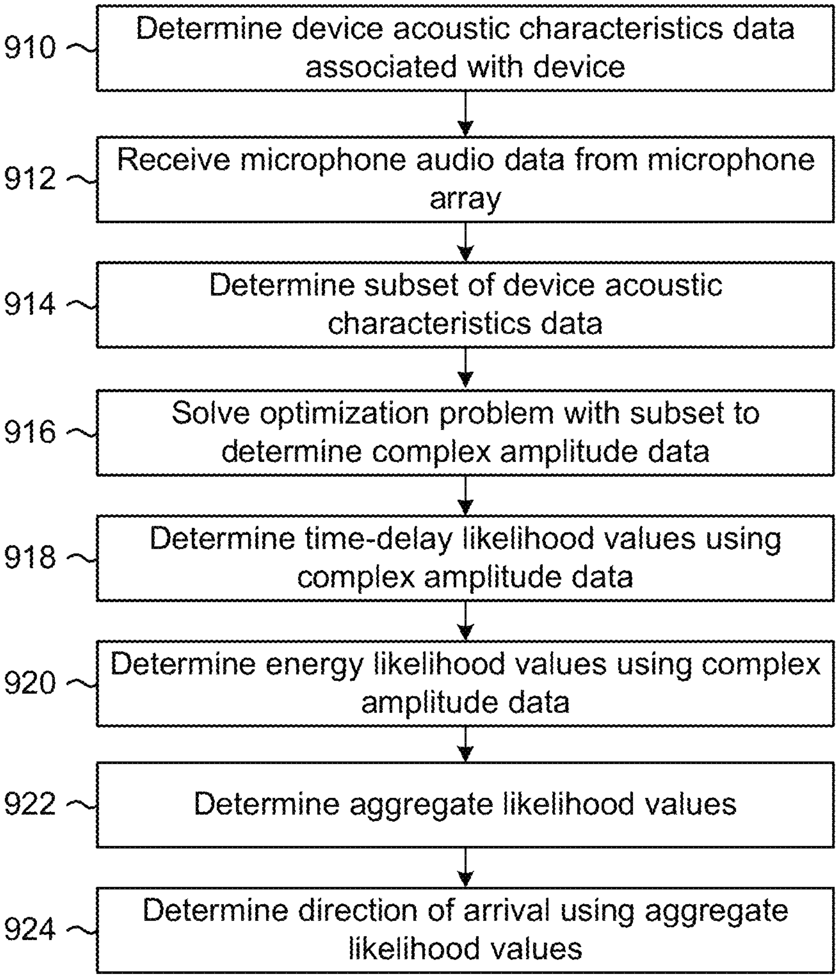
FIG. 9 is a flowchart conceptually illustrating an example method for performing sound source localization by determining a maximum likelihood value according to embodiments of the present disclosure.

FIG. 9 is a flowchart conceptually illustrating an example method for performing sound source localization by determining a maximum likelihood value according to embodiments of the present disclosure. As illustrated in FIG. 9, the device 110 may determine (910) device acoustic characteristics data 114 associated with the device 110. As the device acoustic characteristics data 114 only need to be determined once for a particular microphone array, in some examples the device 110 may retrieve the device acoustic characteristics data 114 from a storage device without departing from the disclosure. In addition, the device 110 may receive (912) microphone audio data from the microphone array 120.

Using the microphone audio data 112 and the device acoustic characteristics data 114, the device 110 may determine (914) a subset of the device acoustic characteristics data 114 and may solve (916) an optimization problem with the subset of the device acoustic characteristics data 114 to determine the complex amplitude data 116, as described in greater detail below with regard to FIGS. 6-8. For example, the device 110 may generate an optimization model and may solve the optimization model using a regularization function to determine the complex amplitude data 116.

As illustrated in FIG. 9, the device 110 may determine (918) time-delay likelihood values using the complex amplitude data 116 and may determine (920) energy likelihood values (e.g., energy-based likelihood values) using the complex amplitude data 116. For example, the device 110 may estimate a time-delay likelihood value and an energy-based likelihood value for each of the acoustic plane-waves (e.g., directional components). As used herein, a time-delay likelihood value may indicate a likelihood that a particular acoustic plane-wave has a shortest time delay (e.g., arrived at the device first) of a plurality of acoustic plane-waves, while an energy-based likelihood value may indicate a likelihood that the particular acoustic plane-wave has a highest energy value of the plurality of acoustic plane-waves.

Using these likelihood values, the device 110 may determine (922) aggregate likelihood values and may determine (924) a direction of arrival associated with the sound source (e.g., user 5) using the aggregate likelihood values. In some examples, the device 110 may determine the aggregate likelihood values by adding the time-delay likelihood values and the energy likelihood values, although the disclosure is not limited thereto. To determine the direction of arrival (e.g., azimuth value), the device 110 may determine a maximum aggregate likelihood value (e.g., highest value of the aggregate likelihood values), may identify a first acoustic plane-wave associated with the maximum aggregate likelihood value, and determine the azimuth value corresponding to the first acoustic plane-wave, although the disclosure is not limited thereto. Thus, the device 110 may use the aggregate likelihood values to identify a dominant acoustic plane-wave that corresponds to a direct path (e.g., line-of-sight) between the sound source (e.g., user 5) and the device 110, distinguishing this acoustic plane-wave from other acoustic plane-waves that correspond to acoustic reflections.

Assuming that a source audio signal X (w) experiences multiple reflections in the acoustic path towards a microphone array, the reflections at the receiving microphone (e.g., {Xx (w)} k) may be calculated as:

$$X_k(w) \sim e^{-j\omega\tau_k}\delta_k(\omega)X(\omega) \quad [13]$$

where $\tau_k>0$ is the corresponding delay, and ok is a real-valued propagation loss. Define:

$$Q_{lk}(\omega) \triangleq \frac{X_l(\omega)}{X_k(\omega)} \approx e^{j\omega(\tau_k-\tau_l)}\frac{\delta_l(\omega)}{\delta_k(\omega)} \quad [14]$$

which can be further simplified as:

$$\overline{Q}_{lk}(\omega) \triangleq \frac{Q_{lk}(\omega)}{\|Q_{lk}(\omega)\|} \approx e^{j\omega(\tau_k-\tau_l)} \quad [15]$$

The device 110 may use the above relation to find the time delay between two components. However, it is susceptible to phase wrapping at large frequency @, and one extra step is needed to mitigate its impact. Define for a frequency shift A:

$$R_{lk}(\omega) \triangleq \frac{\overline{Q}_{lk}(\omega+\Delta)}{\overline{Q}_{lk}(\omega)} \approx e^{j\Delta(\tau_k-\tau_l)} \quad [16]$$

This eliminates a dependence on frequency @, and if the frequency shift A is chosen small enough, this eliminates the issue of phase wrapping. Then, the device 110 may determine an estimated delay between components l and k (e.g., $P_{lk} \triangleq \tau_k-\tau_l$) as:

$$\overline{\rho}_{lk} = \frac{1}{\sum_{\omega\in\Omega} W(\omega)}\sum_{\omega\in\Omega} W(\omega)\frac{\angle R_{lk}(\omega)}{\Delta} \quad [17]$$

where a weighting function W (@) is proportional to a signal-to-noise-ratio (SNR) (e.g., signal quality metric) of the corresponding frequency band, as in Equation [11]. Note that if $P_{lk}>0$, then the k-th reflection is delayed from the I-th reflection and vice versa. Hence, the probability that the k-th component is delayed from the I-th component is $P(P_{lk}>0)$, where $P_{lk}$ is the true value of $\tau_k-\tau_l$.

The system 100 may assume that $P_{lk} \sim \mathcal{N}(P_{lk}, \sigma^2)$, hence a time delay estimation 1110 can be calculated as:

$$P(\tau_k > \tau_l) \equiv P(\rho_{lk} > 0) \approx \frac{1}{2}\operatorname{erfc}\left(\frac{-\rho_{lk}}{\sigma\sqrt{2}}\right) \quad [18]$$

where erfc(.) is the complementary error function. Note that P $(\tau_k<\tau_l)$=1−P $(\tau_k>\tau_l)$, hence the device 110 may calculate $P_{lk}$ once for each pair of components.

The acoustic reflections are approximated by $\{\alpha_l(\omega;t)\}_\omega$. The probability that the I-th component is the first to arrive at the microphone array by Bi can be expressed by:

$$\begin{aligned}\beta_l &\triangleq P(\tau_l < \min\{\tau_k\}_{k\neq l}) \\ &= \prod_{k\neq l} P(\rho_{lk} > 0)\end{aligned} \quad [19]$$

which, using Equation [18], can be expressed in the log-domain as time-delay likelihood estimation 1120:

$$\overline{\beta}_l \approx \sum_{k\neq l}\log\left(\operatorname{erfc}\left(\frac{-\overline{\rho}_{lk}}{\sigma\sqrt{2}}\right)\right) \quad [20]$$

The time-delay likelihood estimation 1120 is an accurate approximation of the time-delay likelihood function in certain conditions. For example, the device 110 may validate that this approximation is accurate by calculating a correlation coefficient between the two components and determining that the correlation coefficient is above a predetermined threshold, although the disclosure is not limited thereto.

The true energy of the line-of-sight component is theoretically higher than the energy of each individual reflection. However, due to the finite number of microphones, the calculated directional components may have errors. Nevertheless, the line-of-sight energy is usually among the highest energy components. The device 110 may calculate an amount of energy for each component using energy estimation 1130:

$$E_l = \Sigma_\omega \|\alpha_l(\omega;t)\|^2 W(\omega) \quad [21]$$

where W(ω) is a weighting function that is proportional to SNR for each frequency band (e.g., frequency range), as described above. Thus, the device 110 is not weighting all frequencies evenly, but is instead weighting frequency bands based on an SNR value (e.g., higher SNR value, more weight associated with the frequency band). Therefore, the weighting function W(ω) is determined based on system conditions and may be identical when calculating the time-delay likelihood estimation 1120 (e.g., Equation [17]) and when calculating the energy estimation 1130 (e.g., Equation [21]).

A directional component may be a candidate to be the line-of-sight component if an energy value is above a threshold value (e.g., $E_l > v\cdot\max\{E_k\}$, where v is a predetermined threshold). If the number of directional components that satisfy this condition is M, then the energy-based likelihood is computed as an energy likelihood estimation 1140:

$$\gamma_l = \begin{cases} -\log M & \text{if} \quad E_l > v\cdot\max\{E_k\} \\ \varepsilon & \text{otherwise} \end{cases} \quad [22]$$

where & <<−log M corresponds to a small probability value to account for computation errors.

At each time frame, the device may calculate log-likelihoods $\beta_l$ and $\gamma_l$ for the I-th directional component as in Equations and respectively. This corresponds to azimuth angle $\phi_l$ of the corresponding entry of the device dictionary, and the total likelihood at azimuth angle $\phi_l$ is the sum of the two likelihoods. Due to the finite dictionary size and the finite precision of the computation (with variance K) of the true azimuth angle around azimuth angle $\phi_l$, the likelihood for azimuth angles adjacent to azimuth angle $\phi_l$ is approximated as local aggregate likelihood estimation 1150:

$$\chi(\phi; t) = \max\left(\chi(\phi; t); \beta_l + \gamma_l - \frac{(\phi - \phi_l)^2}{2\kappa}\right) \quad [23]$$

and the likelihood function x (.) of all azimuth angles is updated according to Equation with every new directional component.

The final step is for the device 110 to calculate the maximum-likelihood estimate of the azimuth angle by aggregating the local likelihood x(ϕ). Thus, the device 110 may calculate a global likelihood for each azimuth angle as global aggregate likelihood estimation 1160:

$$X(\phi)=\Sigma_t X(\phi;t) \quad [24]$$

To illustrate an example, the local aggregate likelihood estimation 1150 may correspond to spatial aggregation, as the device 110 looks at every azimuth value and aggregates everything within a particular range (e.g., aggregating from directional components to azimuth angles). In contrast, the global aggregate likelihood estimation 1160 may correspond to temporal aggregation over a desired time window, as the device 110 looks at selected azimuth values for a period of time and generates a single output azimuth value.

In some examples, the desired time window may correspond to an acoustic event, such as a time boundary associated with a wakeword detected by the device 110. For example, the device 110 may detect a wakeword, determine a time boundary associated with the wakeword, and calculate the global aggregate likelihood estimation 1160 within the time boundary to generate a single azimuth value associated with the wakeword. However, the disclosure is not limited thereto, and in some examples the desired time window may instead correspond to a fixed duration of time. For example, the device 110 may use the global aggregate likelihood estimation 1160 to determine an azimuth value for each individual audio frame (e.g., 8 ms) without departing from the disclosure. In this example, the device 110 may determine an azimuth value for a series of audio frames and, if a wakeword is detected within a time boundary, may optionally determine a final azimuth value associated with the wakeword based on the audio frames within the time boundary.

In some examples, the device 110 may determine the direction of arrival by determining an azimuth value. Thus, while the directional components may correspond to both an azimuth angle and an elevation angle, the device 110 may average across elevation and select an azimuth value associated with a range of elevation angles. However, the disclosure is not limited thereto, and in other examples the device 110 may determine the direction of arrival by determining an azimuth value and an elevation value without departing from the disclosure.

Figure 10:
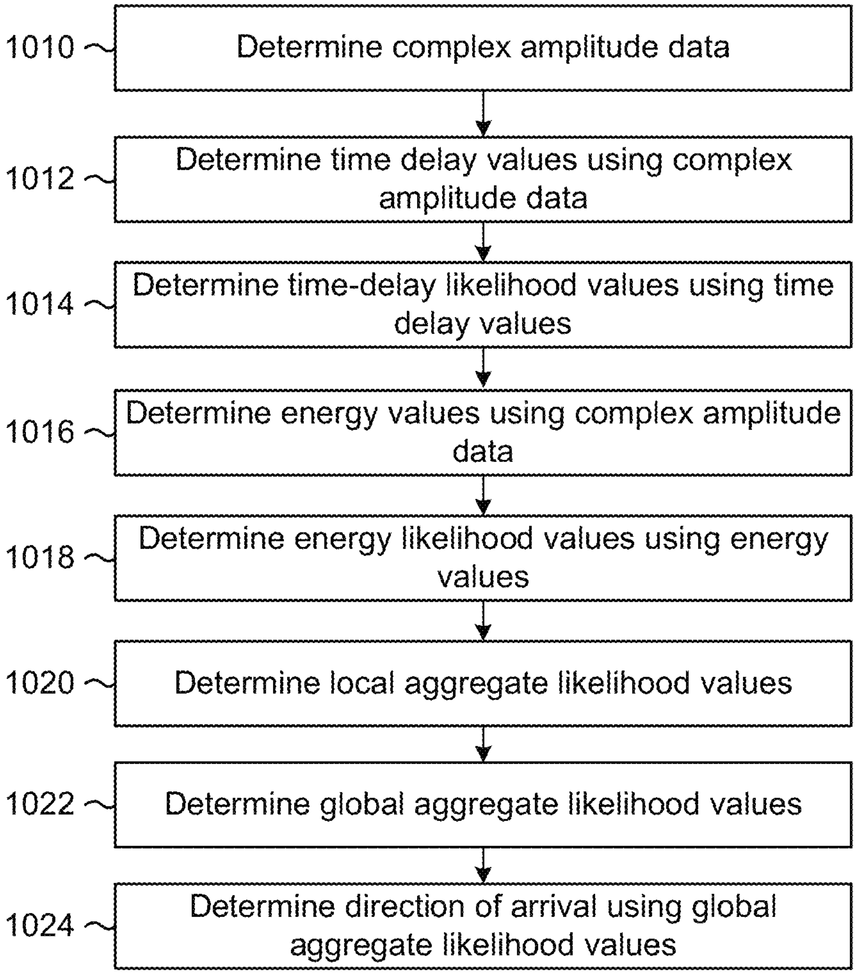
FIG. 10 is a flowchart conceptually illustrating an example method for performing sound source localization by determining a maximum likelihood value according to embodiments of the present disclosure.

FIG. 10 is a flowchart conceptually illustrating an example method for performing sound source localization by determining a maximum likelihood value according to embodiments of the present disclosure. As illustrated in FIG. 10, the device 110 may determine (1010) the complex amplitude data 116, may determine (1012) time delay values using the complex amplitude data 116, and may determine (1014) time-delay likelihood values using the time delay values. For example, the device 110 may determine a time delay value between components l and k (e.g., $P_{lk} \triangleq \tau_k - \tau_l$) using the time delay estimation 1110 shown as Equation above.

Based on these time delay values, the device 110 may determine time-delay likelihood values using time-delay likelihood estimation 1120 calculated using Equation above. Thus, a time-delay likelihood value may indicate a likelihood that a particular acoustic plane-wave has a shortest time delay (e.g., arrived at the device first) of a plurality of acoustic plane-waves.

The device 110 may determine (1016) energy values using the complex amplitude data 116 and may determine (1018) energy likelihood values (e.g., energy-based likelihood values) using the energy values. For example, the device 110 may determine the energy values using energy estimation 1130, shown as Equation above.

Based on these energy values, the device 110 may determine energy likelihood values using energy likelihood estimation 1140, shown as Equation above. Thus, an energy-based likelihood value may indicate a likelihood that the particular acoustic plane-wave has a highest energy value of the plurality of acoustic plane-waves.

Using the time-delay likelihood values and the energy likelihood values, the device 110 may determine (1020) local aggregate likelihood values and may determine (1022) global aggregate likelihood values. In some examples, the device 110 may determine the aggregate likelihood values by adding the time-delay likelihood values and the energy likelihood values, although the disclosure is not limited thereto.

This corresponds to azimuth value $\phi_l$ of the corresponding entry of the device acoustic characteristics data 114 (e.g., a device dictionary), and the total likelihood at this azimuth value $\phi_l$ is a sum of the two likelihood values. However, due to the finite dictionary size and the finite precision of the computation, the true angle of the 1-th component can be an angle adjacent to the azimuth value ($\phi_l$). Assuming a normal distribution (with variance κ) of the true azimuth value around $\phi_l$, the likelihood for azimuth angles adjacent to the azimuth value ($\phi_l$) is approximated using local aggregate likelihood estimation 1150, shown as Equation above. These local aggregate likelihood values can be used to determine global aggregate likelihood values for each azimuth value, using global aggregate likelihood estimation 1160, shown as Equation above.

Finally, the device 110 may determine (1024) a direction of arrival associated with the sound source (e.g., user 5) using the global aggregate likelihood values. To determine the direction of arrival (e.g., azimuth value), the device 110 may determine a maximum global aggregate likelihood value (e.g., highest value of the global aggregate likelihood values), may identify a first acoustic plane-wave associated with the maximum global aggregate likelihood value, and determine the azimuth value corresponding to the first acoustic plane-wave, although the disclosure is not limited thereto. Thus, the device 110 may use the global aggregate likelihood values to identify a dominant acoustic plane-wave that corresponds to a direct path (e.g., line-of-sight) between the sound source (e.g., user 5) and the device 110, distinguishing this acoustic plane-wave from other acoustic plane-waves that correspond to acoustic reflections.

Figure 12:
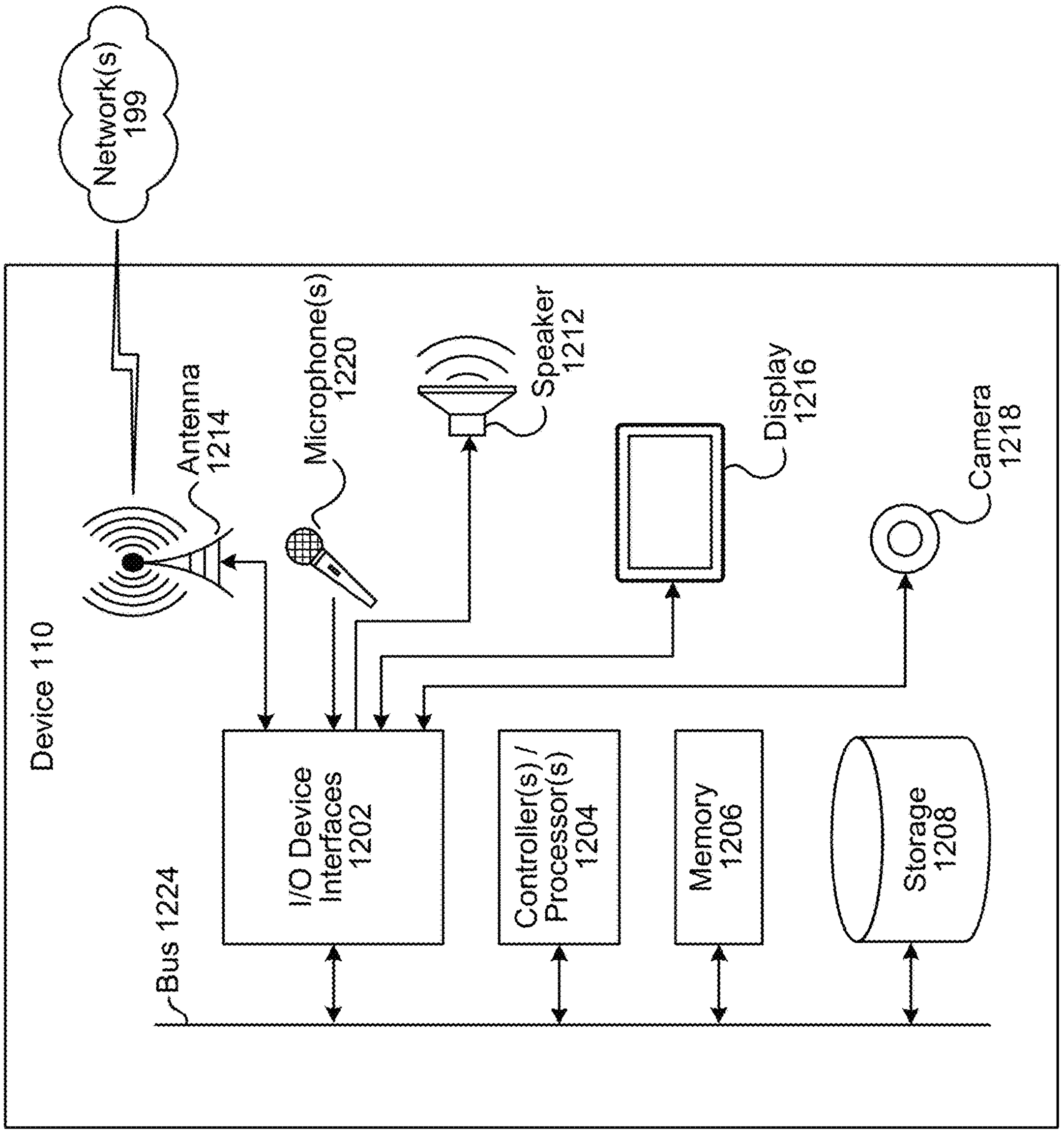
FIG. 12 is a block diagram conceptually illustrating example components of a device according to embodiments of the present disclosure.

FIG. 12 is a block diagram conceptually illustrating a device 110 that may be used with the system according to embodiments of the present disclosure. The device 110 may include one or more controllers/processors 1204, which may each include a central processing unit (CPU) for processing data and computer-readable instructions, and a memory 1206 for storing data and instructions of the respective device. The memories 1206 may individually include volatile random access memory (RAM), non-volatile read only memory (ROM), non-volatile magnetoresistive memory (MRAM), and/or other types of memory. The device 110 may also include a data storage component 1208 for storing data and controller/processor-executable instructions. Each data storage component 1208 may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces 1202.

Computer instructions for operating the device 110 and its various components may be executed by the respective device's controller(s)/processor(s) 1204, using the memory 1206 as temporary "working" storage at runtime. A device's computer instructions may be stored in a non-transitory manner in non-volatile memory 1206, storage 1208, or an external device(s). Alternatively, some or all of the executable instructions may be embedded in hardware or firmware on the respective device in addition to or instead of software.

The device 110 includes input/output device interfaces 1202. A variety of components may be connected through the input/output device interfaces 1202, as will be discussed further below. Additionally, the device 110 may include an address/data bus 1224 for conveying data among components of the respective device. Each component within a device 110 may also be directly connected to other components in addition to (or instead of) being connected to other components across the bus 1224.

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, microphone(s) 1220 included in the microphone array 120. If an array of microphones is included, approximate distance to a sound's point of origin may be determined by acoustic localization based on time and amplitude differences between sounds captured by different microphones of the array. In some examples, the device 110 may additionally include a display 1216 for displaying content and/or a camera 1218, although the disclosure is not limited thereto.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface 1202 may also include communication components that allow data to be exchanged between devices such as different physical servers in a collection of servers or other components.

The components of the device 110 may include their own dedicated processors, memory, and/or storage. Alternatively, one or more of the components of the device 110 may utilize the I/O interfaces 1202, processor(s) 1204, memory 1206, and/or storage 1208 of the device 110, respectively.

As noted above, multiple devices may be employed in a single system. In such a multi-device system, each of the devices may include different components for performing different aspects of the system's processing. The multiple devices may include overlapping components. The components of the device 110, as described herein, are illustrative, and may be located as a stand-alone device or may be included, in whole or in part, as a component of a larger device or system.

Multiple device 110 and/or other components may be connected over a network(s) 199. The network(s) 199 may include a local or private network or may include a wide network such as the Internet. Devices may be connected to the network(s) 199 through either wired or wireless connections. For example, the devices 110 may be connected to the network(s) 199 through a wireless service provider, over a WiFi or cellular network connection, or the like. Other devices may be included as network-connected support devices, which may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

retrieving device acoustic characteristics data representing a frequency response of a microphone array of a device, the microphone array including a first microphone and a second microphone, the device acoustic characteristics data corresponding to a plurality of acoustic plane waves;

generating, by the device using the first microphone and the second microphone, first audio data including a representation of an audible sound generated by a sound source;

determining, using the first audio data and the device acoustic characteristics data, first coefficient data corresponding to the plurality of acoustic plane waves, the first coefficient data representing directional components associated with the audible sound;

determining, using the first coefficient data and the device acoustic characteristics data, a first value representing a first likelihood that a first acoustic plane wave, from among the plurality of acoustic plane waves, arrived earliest at the microphone array;

determining, using the first coefficient data and the device acoustic characteristics data, a second value representing a second likelihood that the first acoustic plane wave has a highest energy value from among the plurality of acoustic plane waves;

determining, using the first value and the second value, a third value associated with the first acoustic plane wave; and determining, using the third value, an azimuth value indicating a direction of the sound source with respect to the device.

2. The computer-implemented method of claim 1, wherein determining the first value further comprises:

determining, using the first coefficient data and the device acoustic characteristics data, a first time delay value between the first acoustic plane wave and a second acoustic plane wave of the plurality of acoustic plane waves;

determining, using the first coefficient data and the device acoustic characteristics data, a second time delay value between the first acoustic plane wave and a third acoustic plane wave of the plurality of acoustic plane waves; and determining, using the first time delay value and the second time delay value, the first value.

3. A computer-implemented method, the method comprising:

determining first data corresponding to a first microphone and a second microphone of a device, the first data associated with a plurality of acoustic waves;

generating, by the device, first audio data including a representation of an audible sound generated by a sound source;

determining, using the first audio data and the first data, first coefficient data corresponding to the plurality of acoustic waves;

determining, using the first coefficient data and the first data, a first value indicating a first likelihood that a first acoustic wave, from among the plurality of acoustic waves, has a shortest time delay between the sound source and the device;

determining, using the first coefficient data and the first data, a second value indicating a second likelihood that the first acoustic wave has a highest energy value of the plurality of acoustic waves; and determining, using the first value and the second value, a first azimuth value associated with the sound source.

4. The computer-implemented method of claim 3, further comprising:

determining, using the first audio data and the first data, a subset of the first data that corresponds to a subset of the plurality of acoustic waves, wherein the first coefficient data is determined using the subset of the first data.

5. The computer-implemented method of claim 3, wherein determining the first value further comprises:

determining, using the first coefficient data and the first data, a first time delay value between the first acoustic wave and a second acoustic wave of the plurality of acoustic waves;

determining, using the first coefficient data and the first data, a second time delay value between the first acoustic wave and a third acoustic wave of the plurality of acoustic waves; and determining, using a plurality of time delay values that includes the first time delay value and the second time delay value, the first value.

6. The computer-implemented method of claim 3, wherein determining the second value further comprises:

determining, using the first coefficient data, a plurality of energy values that includes a first energy value corresponding to the first acoustic wave;

determining a highest energy value of the plurality of energy values;

determining, using the highest energy value, a threshold value;

determining that a subset of the plurality of energy values exceed the threshold value, the subset of the plurality of energy values including the first energy value; and determining the second value based on the subset of the plurality of energy values.

7. The computer-implemented method of claim 3, wherein determining the first azimuth value further comprises:

determining, using the first value and the second value, a third value indicating a third likelihood that the sound source is in a first direction relative to the device, the first direction associated with the first acoustic wave;

determining a plurality of likelihood values including the third value and a fourth value associated with a second direction; and determining that the third value is highest of the plurality of likelihood values;

wherein the first direction corresponds to the first azimuth value.

8. The computer-implemented method of claim 3, wherein determining the first azimuth value further comprises:

determining, using the first value and the second value, a third value indicating a third likelihood that the sound source is in a first direction relative to the device for a first time duration, the first direction associated with the first acoustic wave;

determining a fourth value indicating a fourth likelihood that the sound source is in the first direction for a second time duration;

determining, using the third value and the fourth value, a fifth value indicating a fifth likelihood that the sound source corresponds to the first direction; and determining that the fifth value is a highest value of a plurality of likelihood values;

wherein the first direction corresponds to the first azimuth value.

9. The computer-implemented method of claim 3, further comprising:

determining a first signal metric value associated with a first frequency band;

determining a second signal metric value associated with a second frequency band; and determining, using the first signal metric value and the second signal metric value, a plurality of weight values including a first weight value associated with the first frequency band and a second weight value associated with the second frequency band, wherein the first value and the second value are calculated using the plurality of weight values.

10. The computer-implemented method of claim 3, further comprising:

detecting an acoustic event represented in the first audio data; and determining a time duration associated with the acoustic event, wherein the first azimuth value is determined using the time duration.

11. The computer-implemented method of claim 3, wherein determining the first azimuth value further comprises:

determining a second azimuth value associated with a first portion of the first audio data;

determining that the first azimuth value is associated with a second portion of the first audio data;

detecting an acoustic event represented in the first audio data;

determining a time duration associated with the acoustic event, the time duration corresponding to at least the first portion of the first audio data and the second portion of the first audio data; and determining that the first azimuth value is associated with the sound source using the first azimuth value, the second azimuth value, and the time duration.

12. A system comprising:

at least one processor; and memory including instructions operable to be executed by the at least one processor to cause the system to:

determine first data corresponding to a first microphone and a second microphone of a device, the first data associated with a plurality of acoustic waves;

generate, by the device, first audio data including a representation of an audible sound generated by a sound source;

determine, using the first audio data and the first data, first coefficient data corresponding to the plurality of acoustic waves;

determine, using the first coefficient data and the first data, a first value indicating a first likelihood that a first acoustic wave, from among the plurality of acoustic waves, has a shortest time delay between the sound source and the device;

determine, using the first coefficient data and the first data, a second value indicating a second likelihood that the first acoustic wave has a highest energy value of the plurality of acoustic waves; and determine, using the first value and the second value, a first azimuth value associated with the sound source.

13. The system of claim 12, wherein the memory further comprises instructions that, when executed by the at least one processor, further cause the system to:

determine, using the first audio data and the first data, a subset of the first data that corresponds to a subset of the plurality of acoustic waves, wherein the first coefficient data is determined using the subset of the first data.

14. The system of claim 12, wherein the memory further comprises instructions that, when executed by the at least one processor, further cause the system to:

determine, using the first coefficient data and the first data, a first time delay value between the first acoustic wave and a second acoustic wave of the plurality of acoustic waves;

determine, using the first coefficient data and the first data, a second time delay value between the first acoustic wave and a third acoustic wave of the plurality of acoustic waves; and determine, using a plurality of time delay values that includes the first time delay value and the second time delay value, the first value.

15. The system of claim 12, wherein the memory further comprises instructions that, when executed by the at least one processor, further cause the system to:

determine, using the first coefficient data, a plurality of energy values that includes a first energy value corresponding to the first acoustic wave;

determine a highest energy value of the plurality of energy values;

determine, using the highest energy value, a threshold value;

determine that a subset of the plurality of energy values exceed the threshold value, the subset of the plurality of energy values including the first energy value; and determine the second value based on the subset of the plurality of energy values.

16. The system of claim 12, wherein the memory further comprises instructions that, when executed by the at least one processor, further cause the system to:

determine, using the first value and the second value, a third value indicating a third likelihood that the sound source is in a first direction relative to the device, the first direction associated with the first acoustic wave;

determine a plurality of likelihood values including the third value and a fourth value associated with a second direction; and determine that the third value is highest of a plurality of likelihood values, wherein the first direction corresponds to the first azimuth value.

17. The system of claim 12, wherein the memory further comprises instructions that, when executed by the at least one processor, further cause the system to:

determine, using the first value and the second value, a third value indicating a third likelihood that the sound source is in a first direction relative to the device for a first time duration, the first direction associated with the first acoustic wave;

determine a fourth value indicating a fourth likelihood that the sound source is in the first direction for a second time duration;

determine, using the third value and the fourth value, a fifth value indicating a fifth likelihood that the sound source corresponds to the first direction; and determine that the fifth value is a highest value of a plurality of likelihood values, wherein the first direction corresponds to the first azimuth value.

18. The system of claim 12, wherein the memory further comprises instructions that, when executed by the at least one processor, further cause the system to:

determining a first signal metric value associated with a first frequency band;

determining a second signal metric value associated with a second frequency band; and determining, using the first signal metric value and the second signal metric value, a plurality of weight values including a first weight value associated with the first frequency band and a second weight value associated with the second frequency band, wherein the first value and the second value are calculated using the plurality of weight values.

19. The system of claim 12, wherein the memory further comprises instructions that, when executed by the at least one processor, further cause the system to:

detecting an acoustic event represented in the first audio data; and determining a time duration associated with the acoustic event, wherein the first azimuth value is determined using the time duration.

20. The system of claim 12, wherein the memory further comprises instructions that, when executed by the at least one processor, further cause the system to:

determining a second azimuth value associated with a first portion of the first audio data;

determining that the first azimuth value is associated with a second portion of the first audio data;

detecting an acoustic event represented in the first audio data;

determining a time duration associated with the acoustic event, the time duration corresponding to at least the first portion of the first audio data and the second portion of the first audio data; and determining that the first azimuth value is associated with the sound source using the first azimuth value, the second azimuth value, and the time duration.

* * * * *